(12) United States Patent
Nishikawa et al.

(10) Patent No.: US 7,499,038 B2
(45) Date of Patent: Mar. 3, 2009

(54) THIN-FRAME TOUCH PANEL

(75) Inventors: Kazuhiro Nishikawa, Kyoto (JP);
Kazuhiko Takahata, Kyoto (JP);
Hajime Takemura, Kyoto (JP); Takeshi Asakura, Kyoto (JP); Kazuo Terasawa, Kyoto (JP); Hideki Murakami, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 469 days.

(21) Appl. No.: 10/538,509

(22) PCT Filed: Dec. 10, 2003

(86) PCT No.: PCT/JP03/15768

§ 371 (c)(1),
(2), (4) Date: Jun. 9, 2005

(87) PCT Pub. No.: WO2004/061640

PCT Pub. Date: Jul. 22, 2004

(65) Prior Publication Data

US 2006/0132465 A1    Jun. 22, 2006

(30) Foreign Application Priority Data

Dec. 10, 2002  (JP) ............................ 2002-357424
Sep. 30, 2003  (JP) ............................ 2003-339264

(51) Int. Cl.
*G06F 3/045*    (2006.01)
*G06F 3/041*    (2006.01)

(52) U.S. Cl. ...................................... 345/174; 345/173
(58) Field of Classification Search ................ 345/173, 345/174; 178/18.05
See application file for complete search history.

(56) References Cited

U.S. PATENT DOCUMENTS 4,504,700 A    3/1985    Kubo et al.

(Continued)

FOREIGN PATENT DOCUMENTS

EP    1 102 331    5/2001

(Continued)

OTHER PUBLICATIONS

Dupont Microcircuit Material□□Ceramic Circuit Materials and Technologies□□7713 Silver Feed-through□□2003 Dupont de Nemours and Company.*

*Primary Examiner*—Chanh Nguyen
*Assistant Examiner*—Calvin C Ma
(74) *Attorney, Agent, or Firm*—Wenderoth, Lind & Ponack, L.L.P.

(57) ABSTRACT

In an analog resistive-film touch panel, a lower electrode member has a transparent electrode on a top face of a transparent insulating base member, a pair of bus bars on parallel sides of the transparent electrode, and routing circuits connected to the bus bars for external connection on a portion other than the transparent electrode. Further, an upper electrode member has a transparent electrode on a bottom face of a flexible transparent insulating base, a pair of bus bars on parallel sides of the transparent electrode, and routing circuits connected to the bus bars for external connection on a portion other than the transparent electrode. The lower and upper electrode members face each other in a square pattern via an insulative spacer and are bonded at peripheral portions. The bus bars and the routing circuits are formed from metal thin wires with a diameter of 30 to 100 μm.

9 Claims, 10 Drawing Sheets

U.S. PATENT DOCUMENTS

| | | | |
|---|---|---|---|
| 4,625,075 A | 11/1986 | Jaeger | |
| 5,084,107 A * | 1/1992 | Deguchi et al. | 136/256 |
| 5,844,506 A * | 12/1998 | Binstead | 341/34 |
| 6,597,946 B2 * | 7/2003 | Avrahami et al. | 604/20 |
| 6,727,895 B2 * | 4/2004 | Bottari et al. | 345/174 |
| 7,034,808 B2 * | 4/2006 | Sakata et al. | 345/173 |
| 2002/0090798 A1 * | 7/2002 | Anh et al. | 438/455 |

FOREIGN PATENT DOCUMENTS

| | | |
|---|---|---|
| JP | 63-269218 | 11/1988 |
| JP | 1-281622 | 11/1989 |
| JP | 3-78326 | 8/1991 |
| JP | 9-36395 | 2/1997 |
| JP | 2001-216090 | 8/2001 |

* cited by examiner

THIN-FRAME TOUCH PANEL
>
> ## TECHNICAL FIELD
>
> The present invention relates to an analog resistive-film type touch panel which is disposed on a display screen such as an LCD (Liquid-Crystal Display) or a CRT (Cathode-Ray Tube) connected to a computer and which is pressed from above by fingers or pens in conformity with instructions displayed on the see-through display screen for allowing a position of a pressed section of the display screen to be inputted into the computer. More particularly, the present invention relates to a thin-frame touch panel having a wider input region or display region for use in an information terminal (PDA=Personal Digital Assist) that attaches importance to portability.
>
> ## BACKGROUND ART
>
> Conventionally, touch panels for use in electronic notepads and personal computer include those of analog resistive-film type. Generally, as shown in FIG. 9, a lower-side electrode member 402 having: a transparent electrode 422 on a part of the top face of a transparent insulating base member 421; a pair of bus bars 423, 424 disposed on two parallel sides of the transparent electrode 422; and routing circuits 425, 426 disposed on a portion other than the transparent electrode 422, for connecting the bus bars 423, 424 and external terminals, and an upper-side electrode member 401 having: a transparent electrode 412 on a part of the bottom face of a transparent insulating base member 411 having flexibility; a pair of bus bars 413, 414 disposed on two parallel sides of the transparent electrode 412; and routing circuits 415, 416 disposed on portions other than the transparent electrode 412, for connecting the bus bars 413, 414 and external terminals, are disposed facing each other via an insulative spacer 403 in such a way that the bus bars 413, 414, 423, 424 are arranged in a square pattern, and their peripheral portions are bonded to each other. Moreover, the other ends of the routing circuits 415, 416, 425, 426 are arranged to be on one side of the touch panel and are connected to the end portions of film connectors 407.
>
> The principle of the analog resistive-film type transparent touch panel is such that as shown in FIG. 10, when an arbitrary point P is pressed from the top of the upper-side electrode member 401 by fingers and pens to establish a point-contact between the portions of points P of both the transparent electrodes 412 and 422, a voltage is applied to the transparent electrode 412 of the upper-side electrode member 401 while no voltage is applied to the transparent electrode 422 of the lower-side electrode member 402 so that a potential gradient is generated in the X direction on the transparent electrode 412 of the upper-side electrode member 401 while a divided voltage $e_x$ is generated at the point P on the transparent electrode 412 of the upper-side electrode member 401 and the voltage $e_x$ is detected from a divided voltage output terminal 405 of the lower-side electrode member 402. Herein, when a coordinate of the point P is (x, y), a distance between the bus bars 413 and 414 of the transparent electrode 412 in the upper-side electrode member 401 is $L_1$, and a voltage between the bus bars 413 and 414 is E, the relation of $e_x/E=x/L_1$ is established, which makes it possible to obtain the x-coordinate of the point P from the voltage $e_x$. Moreover, in the case where a voltage is applied to the transparent electrode 422 of the lower-side electrode member 402 while no voltage is applied to the transparent electrode 412 of the upper-side electrode member 401, a divided voltage $e_y$ is generated at the point P on the transparent electrode 422 of the lower-side electrode member 402 and the voltage $e_y$ is detected from a divided voltage output terminal 404 of the lower-side electrode member 401. Herein, when a distance between the bus bars 423 and 424 of the transparent electrode 422 in the lower-side electrode member 401 is $L_2$, and a voltage between the bus bars 433 and 434 is E, the relation of $e_y/E=y/L_2$ is established, which makes it possible to obtain the y-coordinate of the point P from the voltage $e_y$.
>
> Recently, as products becomes smaller in size and screens becomes larger in size, it is desired to form these touch panels such that the bus bars and the interconnections of the routing circuits are fitted in the range of a thin frame which is a slim region starting from the edge of the panel.
>
> However, since the bus bars 413, 414, 423, 424 and the routing circuits 415, 416, 425, 426 are produced from such materials as a conductive paste made by dispersing conductive fillers such as metals including gold, silver, copper, and nickel; and carbons in resin binders, there are the following issues. The interconnections of the bus bars 413, 414, 423, 424 and the routing circuits 415, 416, 425, 426 gain a resistance larger than a specific resistance of the conductive fillers due to the resin which is contained therein as a binder. While a touch position when a constant voltage is applied to the touch panel is determined by the voltage $e_x$ in the X direction and the voltage $e_y$ in the Y direction detected at the divided voltage output terminals as described above, if there is a resistance in the bus bars 413, 414, 423, 424 even with the x-coordinate of the touch position being identical, the x-coordinate of the detected position does not completely coincide at a section close to the connection portion to the routing circuits 415, 416, 425, 426 (a in FIG. 9) and at a section away from the section (b in FIG. 9). The same applies to the case where the y-coordinate of the touch position is identical. The bus bars 413, 414, 423, 424 have a large resistance as they are formed from a conductive paste material, and the resistance is further increase as the bus bars 413, 414, 423, 424 are formed to be thinner, which emphasizes a difference between position detection at the section close to the connection portion to the routing circuits 415, 416, 425, 426 (a in FIG. 9) and position detection at the section away from the section (b in FIG. 9). More particularly, due to linearity, movements by fingers or pens on the transparent touch panel cannot be inputted as they are, resulting in difference in input data. Forming the bus bars 413, 414, 423, 424 to be thicker makes the difference of position detection less prominent, though it hinders achievement of the thin-frame touch panel.
>
> In the touch panel, a specified correction (calibration) is performed so as to see the touch panel in such a manner that the touch position of the touch panel and a displayed position on an LCD obtained through detection of the touch position can be overlapped with respect to each other. While the touch position when a constant voltage is applied to the touch panel is determined by the voltage $e_x$ in the X direction and the voltage $e_y$ in the Y direction detected at the divided voltage output terminals as described above, a detected voltage changes when a resistance of the transparent electrode is changed with time or changed with ambient temperature, resulting in displacement from the displayed position on the LCD. The bus bars and the routing circuits have a large resistance as they are structured from a conductive paste material, and with larger interconnection resistance, the degree of displacement when the transparent electrode is changed with time or with ambient temperature increases. As described above, division of a constant voltage E leads to determination of the input position, though more precisely, the constant voltage E includes an interconnection resistance and so it becomes a voltage E' in the bus bars, whereby division of the voltage E' leads to determination of the input position.

Consequently, in the case where the interconnection resistance does not change with time or with ambient temperature but the resistance of the transparent electrode changes with time or with ambient temperature, the more the interconnection resistance increases, and the larger the change of E' due to the change with time or the change with ambient temperature becomes, which emphasizes the displacement between the touch position on the touch panel and the displayed position on the LCD. By forming the bus bars and the routing circuits to be thicker, the displacement between the touch position on the touch panel and the displayed position on the LCD, if occurring, is made less prominent, though it still hinders achievement of the thin-frame touch panel.

As described above, the conventional touch panel has a limit in pursuit of the thin-frame configuration, and in the case of large-size touch panels, the bus bars and the routing circuits are lengthened, which increases the interconnection resistance, resulting in further difficulty in achievement of the thin-frame touch panel.

Accordingly, in order to solve these issues, the inventors of the present invention have proposed to form the bus bars and the routing circuit interconnections with use of only metal materials as their component materials (see Japanese Unexamined Patent Publication No. 2001-216090 A). More specifically, they are made of metal materials composed only of gold, silver, copper, nickel, or the like formed by an electroplating method, vacuum evaporation method, sputtering method, ion plating method, CVD method, or the like.

However, the bus bars and the routing circuits disclosed in Japanese Unexamined Patent Publication No. 2001-216090 A had the following issues.

First, the bus bars and the routing circuits formed with the use of only metal materials as their component materials in Japanese Unexamined Patent Publication No. 2001-216090 A are formed by the electroplating method, vacuum evaporation method, sputtering method, ion plating method, CVD method, or the like. Since these methods except the electroplating method are formation means in which after a metal thin film is formed on the entire surface, unnecessary portions for the bus bars and the routing circuits need to be removed, the removed metal materials are wasted, thereby causing such an issue that the manufacturing cost of the touch panel is high. Moreover, in the electroplating method, the entire surface is immersed in a plating bath, and so even if rinsing is applied afterward, the transparent input region may be polluted, causing an issue of yields.

Moreover, since the bus bars and the routing circuits are thin films formed by the electroplating method, vacuum evaporation method, sputtering method, ion plating method, CVD method, or the like, the size of their cross sectional areas are largely influenced by the formation widths of the bus bars and the routing circuits. Consequently, if the thin-frame configuration is implemented, the cross sectional areas of the bus bars and the routing circuits decrease, i.e., the resistance increases, by which errors in position detection on the touch panel occur more easily. While forming the bus bars and the routing circuits to be thicker makes the difference in position detection less prominent, forming a film to have a thickness of 30 µm or more by the above-described film formation methods takes an extremely long time, thereby causing an issue of deteriorated production efficiency. Moreover, in the methods other than electroplating method, including the vacuum evaporation method, sputtering method, ion plating method, and CVD method, forming the film to have a larger thickness proportionally increases the metal materials to be removed, thereby further aggravating the issue of cost.

Therefore, an object of the present invention is to solve the aforementioned issues and to provide a thin-frame touch panel which is inexpensive, free from errors in position detection, and sufficient in yields and efficiency during production.

SUMMARY OF THE INVENTION

In accomplishing these and other aspects, the present invention is constituted as shown below.

According to a first aspect of the present invention, there is provided an analog resistive-film type thin-frame touch panel, comprising:

a lower-side electrode member having a lower-side transparent electrode on a part of a top face of a lower-side transparent insulating base member, a pair of lower-side bus bars disposed on two parallel sides of the lower-side transparent electrode, and lower-side external terminal connection portions disposed on a portion other than the lower-side transparent electrode and connected to the lower-side bus bars; and an upper-side electrode member having an upper-side transparent electrode on a part of a bottom face of an upper-side transparent insulating base member having flexibility, a pair of upper-side bus bars disposed on two parallel sides of the upper-side transparent electrode, and upper-side external terminal connection portions disposed on a portion other than the upper-side transparent electrode and connected to the upper-side bus bars, the lower-side electrode member and the upper-side electrode member being disposed facing each other via an insulative spacer in such a way that the upper-side bus bars and the lower-side bus bars are arranged in a square pattern, and being bonded at peripheral portions, wherein the lower-side bus bars are formed from metal thin wires with a wire diameter of 30 to 100 µm and the upper-side bus bars are formed from metal thin wires with a wire diameter of 30 to 100 µm.

According to a second aspect of the present invention, there is provided the thin-frame touch panel as defined in the first aspect, wherein the lower-side electrode member further has lower-side routing circuits disposed on the portion other than the lower-side transparent electrode, for connecting the lower-side bus bars and the lower-side external terminal connection portions, the upper-side electrode member further has upper-side routing circuits disposed on the portion other than the upper-side transparent electrode, for connecting the upper-side bus bars and the upper-side external terminal connection portions, and the lower-side routing circuits are formed from metal thin wires with a wire diameter of 30 to 100 µm and the upper-side routing circuits are formed from metal thin wires with a wire diameter of 30 to 100 µm.

According to a third aspect of the present invention, there is provided the thin-frame touch panel as defined in the second aspect, wherein the metal thin wires constituting each of the lower-side routing circuits and the upper-side routing circuits are extended to outsides of the lower-side electrode member and the upper-side electrode member to constitute the lower-side external terminal connection portions and the upper-side external terminal connection portions.

According to a fourth aspect of the present invention, there is provided the thin-frame touch panel as defined in the first aspect, wherein the lower-side bus bars and the lower-side external terminal connection portions are directly connected and the lower-side bus bars and the lower-side external terminal connection portions are formed from metal thin wires with a wire diameter of 30 to 100 μm, while the upper-side bus bars and the upper-side external terminal connection portions are directly connected and the upper-side bus bars and the upper-side external terminal connection portions are formed from metal thin wires with a wire diameter of 30 to 100 μm, and the metal thin wires of the upper-side external terminal connection portions and the metal thin wires of the lower-side external terminal connection portions are extended to outsides of a region where the lower-side electrode member and the upper-side electrode member are bonded to each other.

According to a fifth aspect of the present invention, there is provided the thin-frame touch panel as defined in any one of the first to fourth aspects, wherein in the upper-side electrode member, the metal thin wire are fixed onto the upper-side transparent insulating base member via a conductive paste and in the lower-side electrode member, the metal thin wires are fixed onto the lower-side transparent insulating base member via a conductive paste.

According to a sixth aspect of the present invention, there is provided the thin-frame touch panel as defined in any one of the first to fourth aspects, wherein in the upper-side electrode member, the metal thin wires are covered with a conductive paste and fixed onto the upper-side transparent insulating base member and in the lower-side electrode member, the metal thin wires are covered with a conductive paste and fixed onto the lower-side transparent insulating base member.

According to a seventh aspect of the present invention, there is provided the thin-frame touch panel as defined in the sixth aspect, wherein a lower-side covering layer formed by being covered with the conductive paste in at least either one of a bend portion of the lower-side routing circuit and the lower-side bus bar in the lower-side electrode member has a width 2 to 5 times larger than a diameter of the metal thin wire in the lower-side electrode member, and a lower-side covering layer formed by being covered with the conductive paste in other portions has a width 1 to 5 times larger than the diameter of the metal thin wire in the lower-side electrode member, while an upper-side covering layer formed by being covered with the conductive paste in at least either one of a bend portion of the upper-side routing circuits and the upper-side bus bars in the upper-side electrode member has a width 3 to 5 times larger than a diameter of the metal thin wire in the upper-side electrode member, and an upper-side covering layer formed by being covered with the conductive paste in other portions has a width 2 to 5 times larger than the diameter of the metal thin wire in the upper-side electrode member.

According to a eighth aspect of the present invention, there is provided the thin-frame touch panel as defined in any one of the first to fourth aspects, wherein a specific resistance value of the metal thin wire is $20 \times 10^{-6}$ Ω·cm or less.

According to a ninth aspect of the present invention, there is provided the thin-frame touch panel as defined in the eighth aspect, wherein the metal thin wire on the transparent insulating base member and its periphery are covered with a conductive paste with a specific resistance value of $1 \times 10^{-4}$ Ω·cm or less.

BRIEF DESCRIPTION OF DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Figure 1:
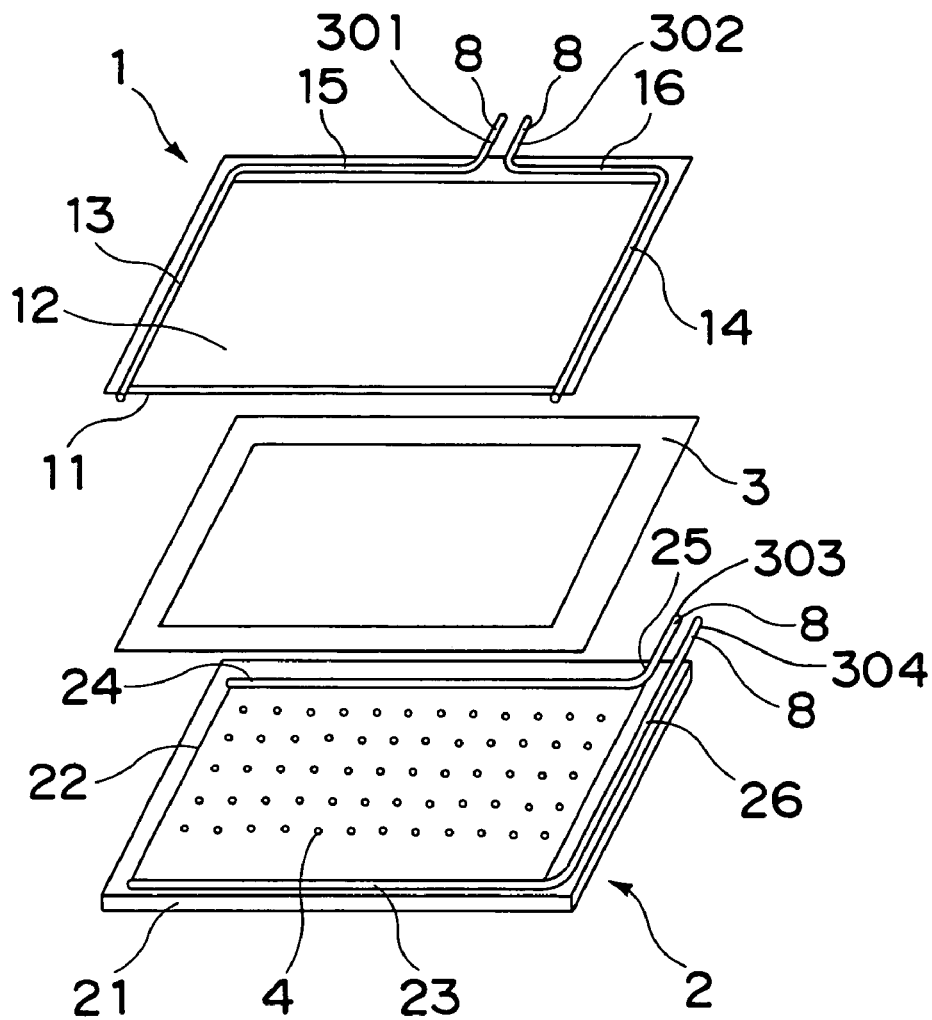
FIG. 1 is an exploded perspective view showing an analog resistive-film type touch panel according to a first embodiment of the present invention.

Before the description of the present invention proceeds, it is to be noted that like parts are designated by like reference numerals throughout the accompanying drawings.

Hereinbelow, a thin-frame touch panel according to a first embodiment of the present invention will be described in detail with reference to the drawings. It is to be noted that the thin frame of the touch panel refers to an interconnection (wiring) region in upper and lower transparent insulating base members of the touch panel, in which bus bars around the transparent insulating base members, routing circuits, and external terminal connection portions are formed, the region being formed such that its thin-frame width size as seen from the outside is 2 mm or lower at least on three sides.

The touch panel shown in FIG. 1 is an analog resistive-film type touch panel comprising: a lower-side electrode member 2 having a lower-side transparent electrode 22 on a part of the top face of a lower-side transparent insulating base member 21, a pair of lower-side bus bars 23, 24 disposed on two parallel sides of the lower-side transparent electrode 22, lower-side routing circuits 25, 26 disposed on portions other than the lower-side transparent electrode 22 and connected to the lower-side bus bars 23, 24, and lower-side external terminal connection portions 303, 304 disposed on the portions other than the lower-side transparent electrode 22 and connected to the lower-side routing circuits 25, 26 for allowing connection between the lower-side routing circuits 25, 26 and the external terminals; and an upper-side electrode member 1 having an upper-side transparent electrode 12 on a part of the bottom face of an upper-side transparent insulating base member 11 having flexibility, a pair of upper-side bus bars 13, 14 disposed on two parallel sides of the upper-side transparent electrode 12, upper-side routing circuits 15, 16 disposed on portions other than the upper-side transparent electrode 12 and connected to the upper-side bus bars 13, 14, and upper-side external terminal connection portions 301, 302 disposed on the portions other than the upper-side transparent electrode 12 and connected to the upper-side bus bars 15, 16 for allowing connection between the upper-side routing circuits 15, 16 and external terminals, the lower-side electrode member 2 and the upper-side electrode member 1 being disposed facing each other via an insulative spacer 3 in such a way that the upper-side and lower-side bus bars 13, 14, 23, 24 are arranged in a square pattern, and being bonded at peripheral portions thereof. In the touch panel, the upper-side and lower-side bus bars 13, 14, 23, 24 and the upper-side and lower-side routing circuits 15, 16, 25, 26 are integrally formed from metal thin wires 8 with a wire diameter of 30 to 100 μm and these four metal thin wires 8 are extended to the outsides of the upper-side electrode member 1 and the lower-side electrode member 2 to constitute the upper-side and lower-side external terminal connection portions 301, 302, 303, 304. As one example, in the lower-side electrode member 2, two metal thin wires 8 forming the lower-side routing circuits 25, 26 are extended from the upper right corner portion of the lower-side electrode member 2 in FIG. 1 to the outside to constitute the lower-side external terminal connection portions 303, 304, while in the upper-side electrode member 1, two metal thin wires 8 forming the upper-side routing circuits 15, 16 are extended from the vicinity of approximately the center of the upper-side side of the upper-side electrode member 1 in FIG. 1 to the outside to constitute the upper-side external terminal connection portions 301, 302.

Usable as the lower-side transparent insulating base member 21 for use in the lower-side electrode member 2 includes: glass plates such as soda glasses, borosilicate glasses, or tempered glasses; engineering plastics such as polycarbonate-based, polyamide-based, or polyether ketone-based plastics; or transparent resin plates or transparent films such as acrylic-based, polyethlene terephthalate-based, or polybutene terephthalate-based plates or films. The lower-side transparent insulating base member 21 for use in the lower-side electrode member 2 may be a laminated article composed of a transparent film and a transparent plastic plate or a glass plate. In this case, durability of the entire touch panel is enhanced and therefore this constitution is desirable.

Usable as the upper-side transparent insulating base member 11 for use in the upper-side electrode member 1 includes: engineering plastics such as polycarbonate-based, polyamide-based, and polyether ketone-based plastics; or transparent films such as acrylic-based, polyethylene terephthalate-based, or polybutene terephthalate-based films. It is to be noted that a hard coat layer may be formed on the face opposite to the face on which the upper-side transparent electrode 12 of the upper-side transparent insulating base member 11 in the upper-side electrode member 1 is formed. Materials of the hard coat layer include: inorganic materials such as siloxane-based resins; or organic materials such as acrylic epoxy-based or urethane-based thermosetting-type resins, or acrylate-based photo-curing resins. The appropriate thickness of the hard coat layer is about 1 to $7\times10^{-3}$ mm. Moreover, in the upper-side transparent insulating base member 11 of the upper-side electrode member 1, the face opposite to the face on which the upper-side transparent electrode 12 is provided may undergo nonglare treatment for prevention of light reflection. For example, it is recommended to apply roughening or to mix fine particles such as extenders, silica, or alumina in the hard coat layer. Further, the upper-side transparent insulating base member 11 of the upper-side electrode member 1 may be formed from a layered product composed of not a single film but a plurality of films overlapped.

The upper-side and lower-side transparent electrodes 12, 22 may be formed from: metallic oxide films such as tin oxide, indium oxide, antimony oxide, zinc oxide, cadmium oxide, or indium tin oxide (ITO); composite films mainly composed of these metallic oxide films; or metal films such as gold, silver, copper, tin, nickel, aluminum, or palladium. Moreover, the upper-side and lower-side transparent electrodes 12, 22 may be formed to be multilayer films composed of two or more layers. These transparent conductive films constituting the upper-side and lower-side transparent electrodes 12, 22 may be formed by vacuum evaporation, sputtering, ion plating, CVD method, or the like. The transparent conductive film may be patterned by performing etching treatment with acid and removing unnecessary portions other than the portions which will constitute the upper-side and lower-side transparent electrodes 12, 22. Moreover, portions other than the portions which will constitute the upper-side and lower-side transparent electrodes 12, 22 on the transparent conductive films may be covered with insulative coatings. Further, on the surface of either one of the upper-side and lower-side transparent electrodes 12, 22, a later-described dot-like spacer 4 may be formed.

The first embodiment of the present invention is characterized in that the upper-side and lower-side bus bars 13, 14, 23, 24 and the upper-side and lower-side routing circuits 15, 16, 25, 26 are integrally formed by the metal thin wires 8 with the wire diameter of 30 to 100 μm. Use of the metal thin wires 8 eliminates the necessity of patterning and saves materials from being discarded wastefully, thereby allowing provision of the inexpensive touch panel. Moreover, pollution of the see-through input region attributed to immersion of the entire surface in a plating bath is avoided, allowing the provision of the touch panel with sufficient yields.

Moreover, by using the metal thin wires 8, the upper-side and lower-side bus bars 13, 14, 23, 24 and the upper-side and lower-side routing circuits 15, 16, 25, 26 may be formed with small widths while at the same time, sufficient cross sectional areas may be secured, i.e., the resistance is kept low so as not to produce errors in position detection on the touch panel. Therefore, it becomes possible to decrease the spaces occupied by the upper-side and lower-side bus bars 13, 14, 23, 24 and the upper-side and lower-side routing circuits 15, 16, 25, 26 in the peripheral portion of the touch panel. That is, it becomes possible to pursue implementation of the thin-frame configuration.

Moreover, with the structure that the upper-side and lower-side routing circuits 15, 16, 25, 26 are formed from the metal thin wires 8, the metal thin wires 8 may be extended to the outsides of the upper-side electrode member 1 and the lower-side electrode member 2 to constitute the upper-side and lower-side external terminal connection portions 301, 302, 303, 304, thereby eliminating the necessity of using film connectors. Therefore, it is not necessary to secure the space in the periphery of the touch panel for inserting and connecting the film connectors to between the upper-side electrode member 1 and the lower-side electrode member 2, which allows implementation of the thinner-frame configuration.

Moreover, since the film connectors are not necessary, the uniform bonding strength can be obtained on the entire peripheral portion of the touch panel. Therefore, when the touch panel is subjected to a high-temperature test and the like, such issues of local distortion occurring and the upper-side electrode member 1 heaving will not arise.

Herein, usable as the materials of the metal thin wires 8 includes gold, copper, or aluminum. The metal thin wires 8 to be used have a wire diameter of 30 to 100 μm. If the wire diameter is less than 30 μm, the cross sectional area becomes small and the wire tends to be disconnected, which brings about difficulty in handling in terms of manufacturing, and causes the easy occurrence of errors in position detection on the touch panel. Moreover, if the wire diameter is more than 100 μm, the gap between the transparent electrodes 12 and 22 increases, which makes input operation difficult.

Figure 2:
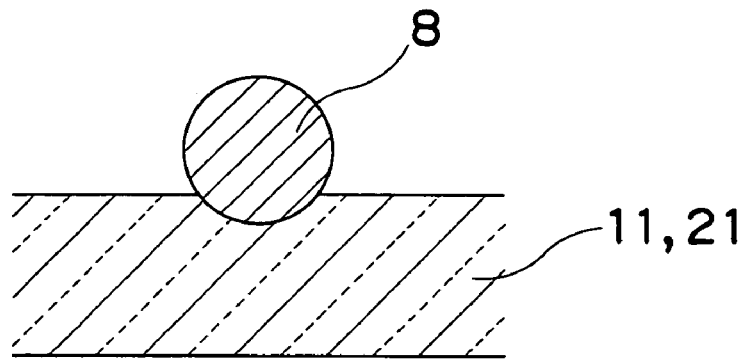
FIG. 2 is a fragmentary cross sectional view showing a fixed state of a metal thin wire in the analog resistive-film type touch panel according to the first embodiment of the present invention.

Fixing of the metal thin wires 8 onto the upper-side and lower-side transparent insulating base members 11, 21 can be achieved by, for example, melting and solidification of the upper-side and lower-side transparent insulating base members 11, 21 (see FIG. 2). More specifically, after the metal thin wires 8 are disposed on the upper-side and lower-side transparent insulating base members 11, 21, the metal thin wires 8 are hot-pressed through heating with a hot iron or through hot pressing to soften the surface layer portions of the upper-side and lower-side transparent insulating base members 11, 21, and then cooled so as to be fixed in the state that a part of each of the metal thin wires 8 is embedded. However, as for the lower-side electrode member 2, this method is employed only when the material of the lower-side transparent insulating base member 21 of the lower-side electrode member 2 is a resin material.

Figure 3:
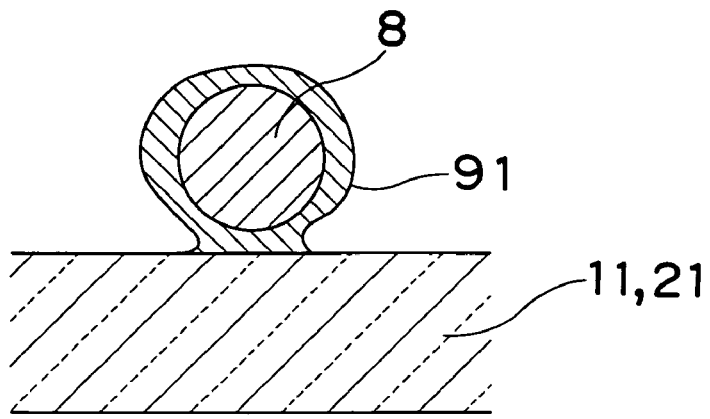
FIG. 3 is a fragmentary cross sectional view showing a fixed state of a metal thin wire in the analog resistive-film type touch panel according to the first embodiment of the present invention.

Moreover, fixing of the metal thin wires 8 may also be achieved by using the metal thin wires 8 whose outer peripheral surfaces are covered with an electrical conductive hot melt material 91 to fix the metal thin wires on the upper-side and lower-side transparent insulating base members 11, 21 by the virtue of melting and solidification of the hot melt material 91 (see FIG. 3). More specifically, after the metal thin wires 8 covered with the electrical conductive hot melt material 91 are disposed on the upper-side and lower-side transparent insulating base members 11, 21, the metal thin wires 8 are hot-pressed by such a method as heating while pressing to soften the hot melt material 91, and by the bonding force of the hot melt material 91 obtained by cooling, the metal thin wires 8 are fixed thereto. Usable as the conductive hot melt material 91 includes: bonding agents formed by distributing particles such as gold, silver, or nickel in composite rubber such as chloroprene; tin; lead; or alloys of tin and lead.

Figure 4:
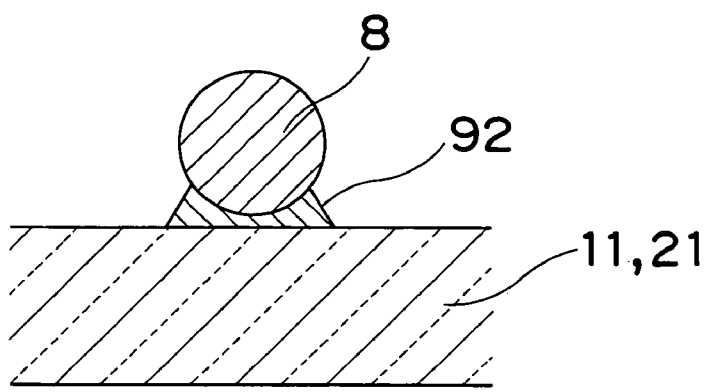
FIG. 4 is a fragmentary cross sectional view showing a fixed state of a metal thin wire in the analog resistive-film type touch panel according to the first embodiment of the present invention.

Moreover, fixing of the metal thin wires 8 may also be achieved by interposing a conductive paste 92 in between the metal thin wires 8 and the upper-side and lower-side transparent insulating base members 11, 21 (see FIG. 4). Used as the conductive paste 92 includes: a thermosetting resin such as epoxy resins, phenol resins, acrylic resins, urethane resins, or silicon resin; or conductive fillers contained in a thermoplastics resin such as polyamide, polyethylene, polystyrene, polyester, polyurethane, ethylene-vinyl acetate copolymer, or ethylene-ethyl acrylate copolymer. Used as the conductive fillers includes: conductive metal powders such as silver, gold, copper, nickel, white gold, or palladium; inorganic insulators such as alumina or glass or organic polymers such as polyethylene, polystyrene, or divinylbenzene which are used as core materials where the surface of the core materials are covered with a conducting layer such as gold or nickel; carbon; or graphite. Moreover, a shape that is usable as the conductive fillers includes a flake shape, a globe shape, or a staple fiber shape. Usable as the method for applying the conductive paste 92 onto the metal thin wires 8 and the upper-side and lower-side transparent insulating base members 11, 21 around the metal thin wires 8 includes screen printing or direct coating with a dispenser.

Figure 5:
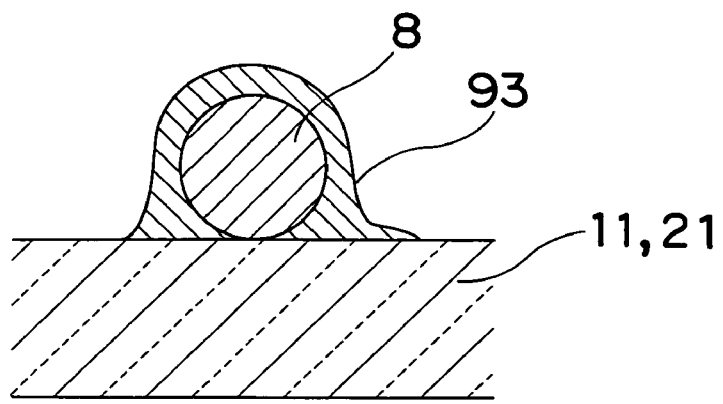
FIG. 5 is a fragmentary cross sectional view showing a fixed state of a metal thin wire in the analog resistive-film type touch panel according to the first embodiment of the present invention.
Figure 6:
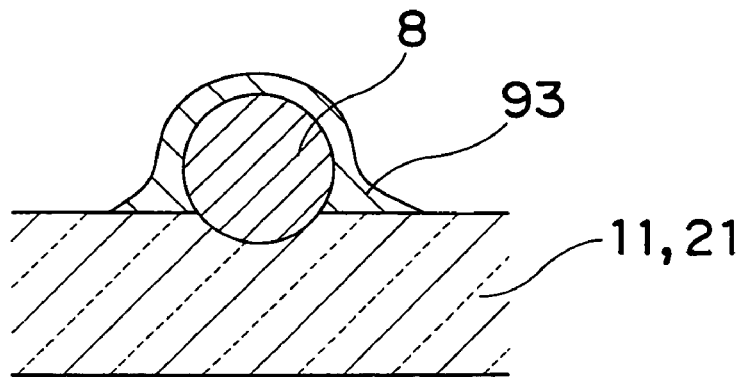
FIG. 6 is a fragmentary cross sectional view showing a fixed state of a metal thin wire in the analog resistive-film type touch panel according to the first embodiment of the present invention.
Figure 7:
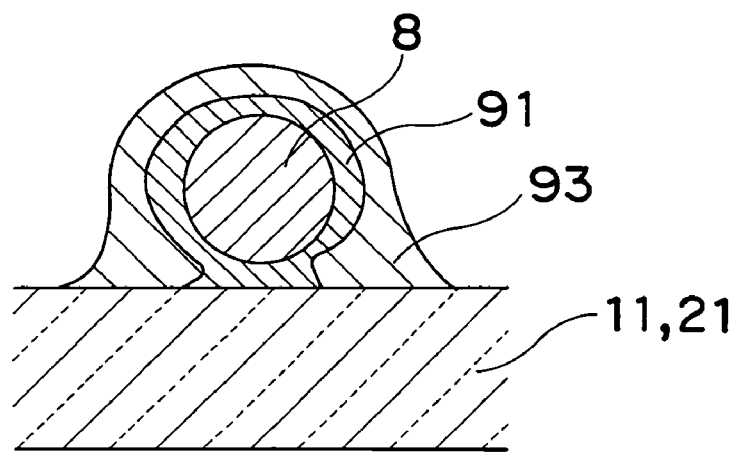
FIG. 7 is a fragmentary cross sectional view showing a fixed state of a metal thin wire in the analog resistive-film type touch panel according to the first embodiment of the present invention.
Figure 8:
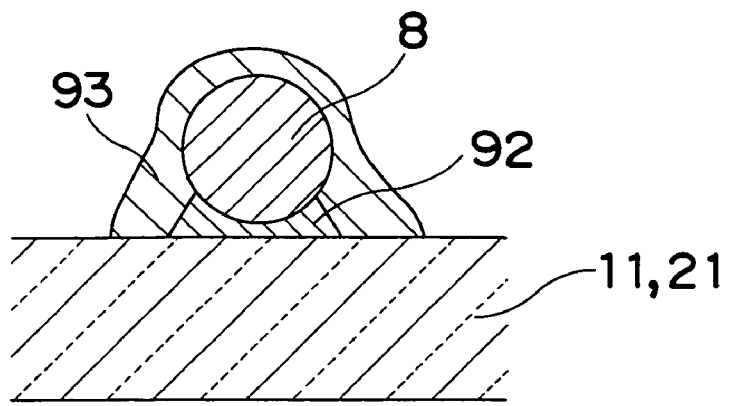
FIG. 8 is a fragmentary cross sectional view showing a fixed state of a metal thin wire in the analog resistive-film type touch panel according to the first embodiment of the present invention.
Figure 9:
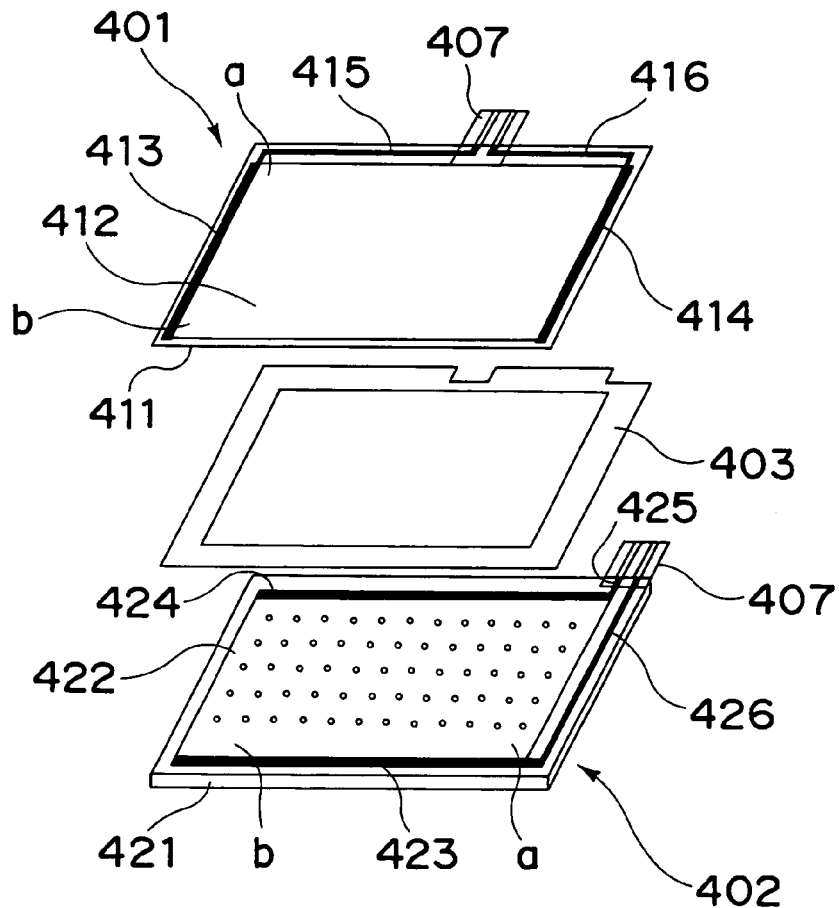
FIG. 9 is an exploded perspective view showing one example of an analog resistive-film type touch panel according to the prior art.
Figure 10:
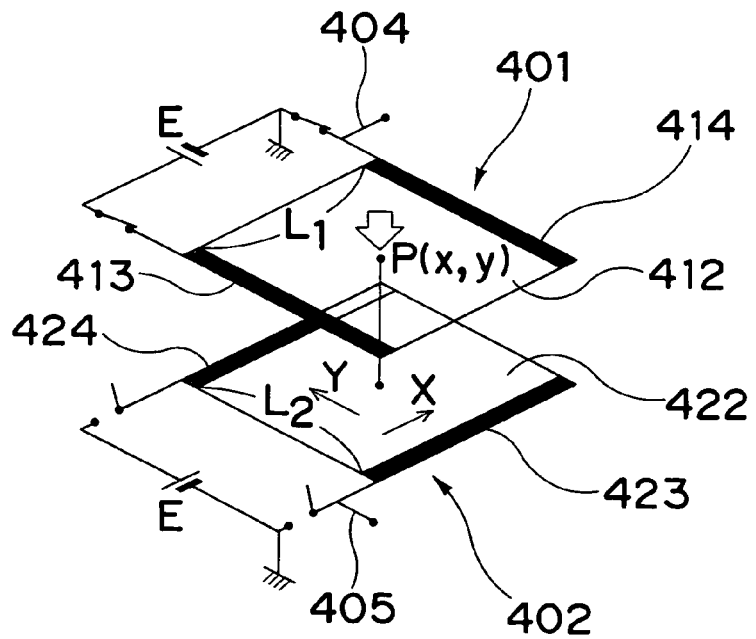
FIG. 10 is a principle view showing an analog resistive-film type touch panel.

Moreover, fixing of the metal thin wires 8 may also be achieved by covering the metal thin wires 8 and the upper-side and lower-side transparent insulating base members 11, 21 around the metal thin wires 8 with a bonding agent 93 (see FIG. 5). More specifically, after the metal thin wires 8 are disposed on the upper-side and lower-side transparent insulating base members 11, 21, the bonding agent 93 is applied onto the metal thin wires 8 and the upper-side and lower-side transparent insulating base members 11, 21 around the metal thin wires 8 by such a method as screen printing or direct coating with a dispenser, and the metal thin wires 8 are interposed in between the upper-side and lower-side transparent insulating base members 11, 21 and the bonding agent 93 and bonded in this state. Usable as the bonding agent 93 includes epoxy resins or acrylic resins. Moreover, in the case of employing the fixing means including melting and softening of the upper-side and lower-side transparent insulating base members 11, 21 and the conductive hot melt material 91 and interposition of the conductive paste 92, the fixing force of the metal thin wires 8 fixed onto the upper-side and lower-side transparent insulating base members 11, 21 may be enhanced by combining the fixing means with the coating with the bonding agent 93 (see FIG. 6 to FIG. 8). In this case, when only the metal thin wires 8 are used, the metal thin wires 8 mainly come into line contact with the upper-side and lower-side transparent insulating base members 11, 21, whereas when the conductive paste is used as the bonding agent 93, the metal thin wires 8 come into face contact with the upper-side and lower-side transparent insulating base members 11, 21, so that compared to the case of using only the metal thin wires 8, the electric connection resistance is decreased, thereby allowing further enhancement of conductivity. In the case of fixing the metal thin wires 8 with the conductive paste, there is such an effect that if the metal thin wires 8 are broken due to stress of some sort or operational mistakes during connecting and forming operation of the metal thin wires 8 onto the upper-side and lower-side transparent insulating base members 11, 21, the covering conductive paste functions as an auxiliary conductive material, thereby preventing malfunction.

It is to be noted that for fixing the metal thin wires 8 onto the upper-side and lower-side transparent insulating base members 11, 21, it is not necessary to fix all the upper-side and lower-side bus bars 13, 14, 23, 24 and the upper-side and lower-side routing circuits 15, 16, 25, 26, and partial bonding is acceptable as long as conduction and sufficient fixation are achieved. Moreover, as shown in FIG. 2 to FIG. 8 showing cross sectional views of the portions which will make the upper-side and lower-side routing circuits 15, 16, 25, 26, the upper-side and lower-side transparent electrodes 12, 22 exist in the portions of the upper-side and lower-side bus bars 13, 14, 23, 24, and in the case of melting and softening the upper-side and lower-side transparent insulating base members 11, 21, the fixed portions of the upper-side and lower-side transparent electrodes 12, 22 deform together with the upper-side and lower-side transparent insulating base members 11, 21.

The spacer 3 is formed into a shape which is capable of insulating the bus bars arranged in a square pattern in between the upper-side and lower-side electrode members, e.g., a frame shape as shown in FIG. 1. While the spacer 3 may be formed from a resin film like the transparent insulating base member or may be formed by printing or applying an appropriate resin such as acrylic-based resins, epoxy-based resins, or silicon-based resins, generally the spacer 3 doubles as a frame-shaped bonding layer made of a double-faced tape, a bonding agent, or an adhesive agent for fixing the upper-side electrode member 1 and the lower-side electrode member 2. For forming a bonding layer made of a bonding agent or an adhesive agent, the screen printing or the like is employed.

Moreover, in the case of forming a large-size touch panel, it is also possible to form a dot-like spacer 4 on the surface of either one of the upper-side and lower-side transparent electrodes 12, 22 for securing a gap between the upper-side and lower-side transparent electrodes 12, 22 of the upper-side electrode member 1 and the lower-side electrode member 2 (see FIG. 1). The dot-like spacer 4 may be obtained by forming an acrylate resin such as melamine acrylate resins, urethane acrylate resins, epoxy acrylate resins, methacrylic acrylate resins, acrylic acrylate resins, or a transparent photocuring resin such as polyvinyl alcohol resin into fine dots through photoprocess. Further, a plurality of fine dots may be formed by a printing method to constitute the spacer. Further, a dispersion liquid made from inorganic or organic particles may be sprayed or applied and then dried to obtain the spacer.

The thin-frame touch panel in the first embodiment of the present invention has the structure and function as described above to fulfill following effects.

More particularly, in the thin-frame touch panel in the first embodiment of the present invention, the upper-side and lower-side bus bars and the upper-side and lower-side routing circuits are integrally formed by the metal thin wires with each wire diameter of 30 to 100 μm, which eliminates the necessity of patterning during formation of the upper-side lower-side bus bars and the upper-side lower-side routing circuits and saves materials from being discarded wastefully, thereby allowing the provision of the inexpensive touch panel. Moreover, since it is not necessary to immerse the entire surface in a plating bath, the see-through input region is prevented from being polluted, allowing the provision of the touch panel with sufficient yields.

Moreover, by using the metal thin wires, the upper-side and lower-side bus bars and the upper-side and lower-side routing circuits may be formed with small widths while at the same time, sufficient cross sectional areas may be secured, i.e., the resistance is kept low so as not to produce errors in position detection on the touch panel. Therefore, it becomes possible to decrease the formation areas of the upper-side and lower-side bus bars and the upper-side and lower-side routing circuits in the peripheral portion of the touch panel. That is, it becomes possible to pursue implementation of the thin-frame configuration. In this case, it does not take time to form the upper-side and lower-side bus bars and the upper-side and lower-side routing circuits with larger cross sectional areas, thereby ensuring sufficient production efficiency.

Moreover, in the thin-frame touch panel in the first embodiment of the present invention, with the structure that the upper-side and lower-side routing circuits are formed from the metal thin wires, the metal thin wires may be extended to the outsides of the upper-side electrode member and the lower-side electrode member to constitute the upper-side and lower-side external terminal connection portions, thereby eliminating the necessity of using film connectors. Therefore, it is not necessary to secure the space in the periphery of the touch panel for inserting and connecting the film connectors to between the upper-side electrode member and the lower-side electrode member, which allows implementation of the thinner-frame configuration.

Moreover, in the thin-frame touch panel in the first embodiment of the present invention, since the film connectors are not necessary, the uniform bonding strength can be obtained on the entire peripheral portion of the touch panel. Therefore, when the touch panel is subjected to a high-temperature test and the like, such issues of local distortion occurring and the upper-side electrode member 1 heaving will not arise.

Next, a thin-frame touch panel according to the second embodiment of the present invention is a thin-frame touch panel with a wide input region or display screen which is different in layout form of metal thin wires from that in the first embodiment.

Figure 16:
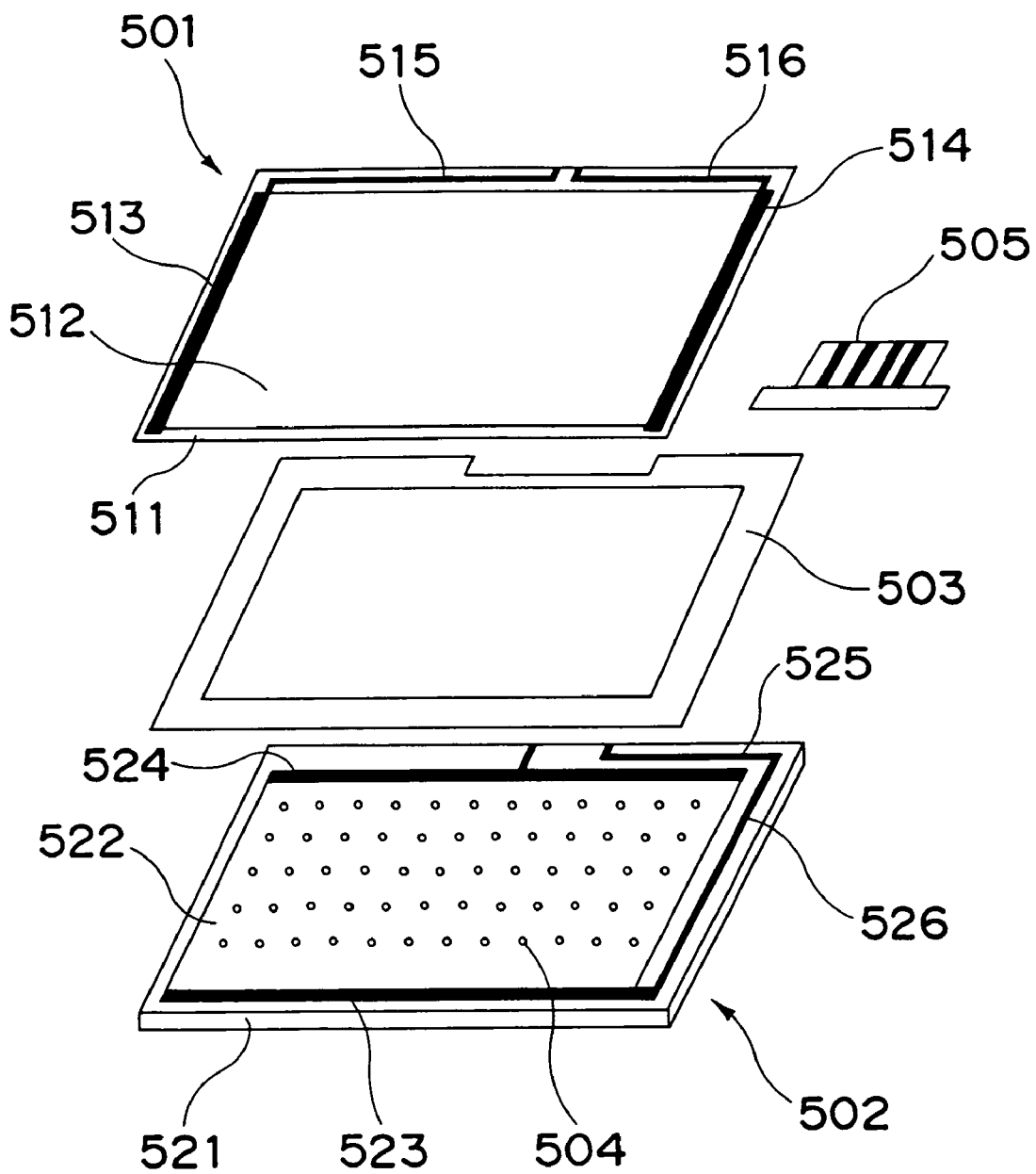
FIG. 16 is an exploded perspective view showing one example of a touch panel according to the prior art.

Conventionally, touch panels for use in electronic notepads and personal computers include those of analog resistive-film type. Generally, as shown in FIG. 16, an upper-side electrode member 501 having: a transparent electrode 512 on a part of the bottom face of a transparent insulating base member 511; a pair of bus bars 513, 514 formed on the transparent electrode 512; and routing circuits 515, 516 disposed on portions other than the transparent electrode 512 for connecting the bus bars 513, 514 and external terminals, and a lower-side electrode member 502 having: a transparent electrode 522 on a part of the top face of a transparent insulating base member 521; a pair of bus bars 523, 524 formed on the transparent electrode 522; and routing circuits 525, 526 formed on portions other than the transparent electrode 522 for connecting the bus bars 523, 524 and external terminals, are disposed facing each other via a spacer 3 in such a way that the bus bars 513, 514, 523, 524 are arranged in a square pattern, and their peripheral portions are bonded to each other. Moreover, the other ends of the routing circuits 515, 516, 525, 526 are arranged to be gathered on one side of the touch panel and are connected to the end portion of a film connector 505.

Recently, as products becomes smaller in size and screens becomes larger in size, it is desired to form these touch panels such that the interconnections of the bus bars and the routing circuits are fitted in the range of a thin frame which is a slim region starting from the edge of the panel (see Japanese Unexamined Patent Publication No. 2001-216090 A).

However, since the bus bars 513, 514, 523, 524 and the routing circuits 515, 516, 525, 526 are produced by screen-printing a conductive past which is formed by dispersing conductive fillers such as metals including gold, silver, copper, or nickel, or carbons in resin binders, a circuit resistance is large and forming the bus bars and routing circuits to have smaller wire widths for achieving thin-frame configuration further increases the circuit resistance. Furthermore, the smaller wire width makes it difficult to print with a uniform film thickness, thereby causing print faint streaking. Such large circuit resistance and streaking attribute to deterioration of input precision of the touch panel. It is to be noted that although use of conductive pastes with a low resistance has been pursued, the present limit of the specific resistance value is about $30 \times 10^{-6}$ Ω·cm.

Moreover, in the prior art, the film connector 505 is used to connect the bus bars 513, 514, 523, 524 and the external terminals, and the routing circuits 515, 516, 525, 526 are present between the bus bars 513, 514, 523, 524 and the film connector 505, which causes the following issue. That is, the film connector 505 and the routing circuits 515, 516, 525, 526 are often gathered on one side of the touch panel and connected, and in this case, the routing circuit 525 and the bus bar 524 are formed in parallel on the same plane. More particularly, in order to achieve the frame width identical to that of the other sides, it is necessary to form each wire width smaller. This further increases deterioration of the input precision.

Moreover, connection between the routing circuits 515, 516, 525, 526 and the film connector 505 has conventionally been established through bonding via anisotropic conductive bonding agents, which requires a wide bonding area for securing bonding strength. Because of this reason, it is difficult to decrease the width of the side where the connection portion with the film connector 505 exists.

Accordingly, the object of the second embodiment of the present invention is to solve the above issue and to provide a thin-frame touch panel which has high input precision and which can achieve thin-frame configuration on all the four sides.

Hereinbelow, the thin-frame touch panel according to the second embodiment of the present invention will be described in detail with reference to FIG. 11 to FIG. 15B.

Figure 11:
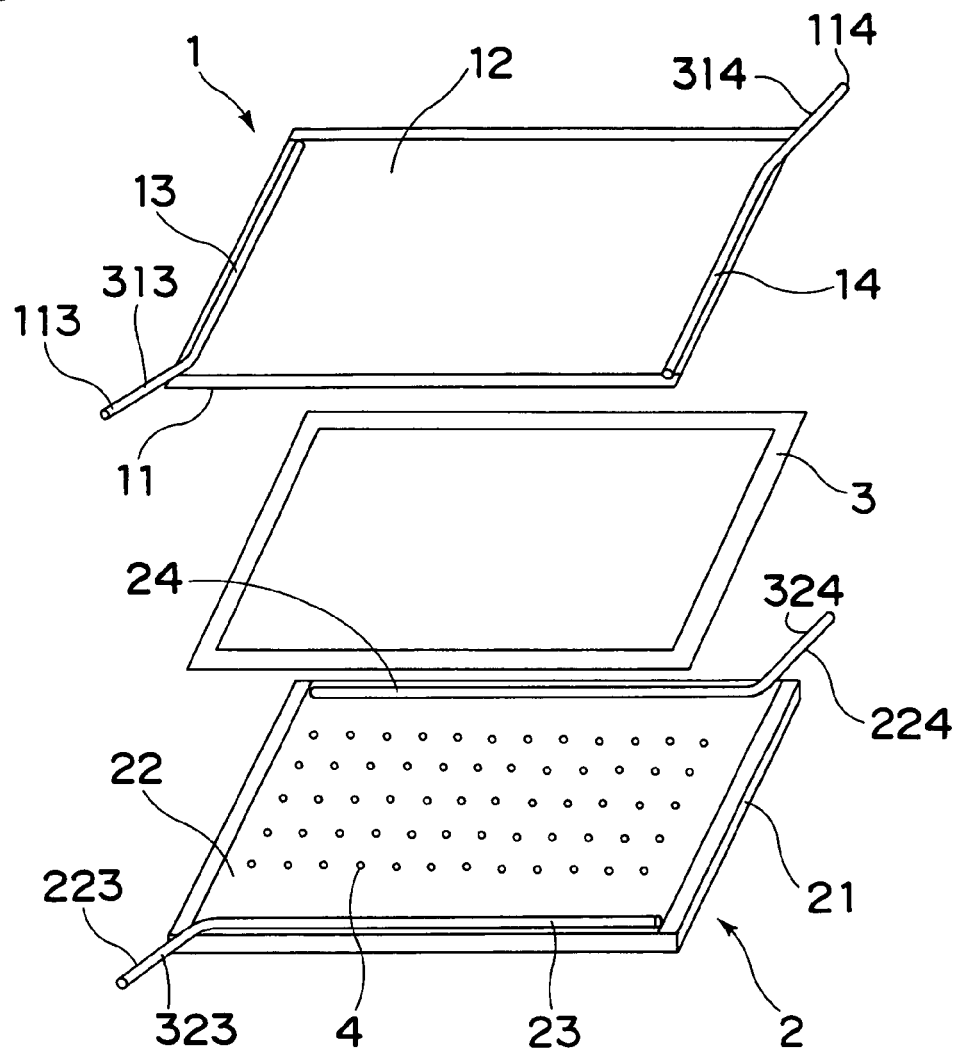
FIG. 11 is an exploded perspective view showing a touch panel according to a second embodiment of the present invention.
Figure 12:
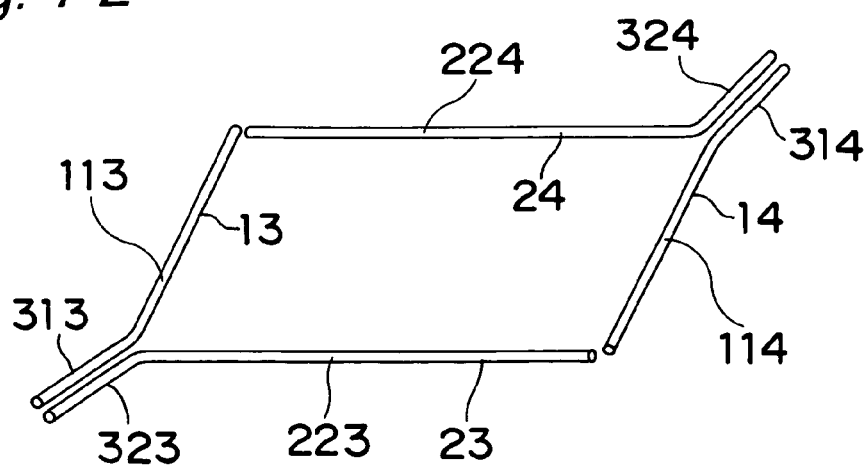
FIG. 12 is a perspective view showing the layout of extended portions of metal thin wires in FIG. 11.
Figure 13:
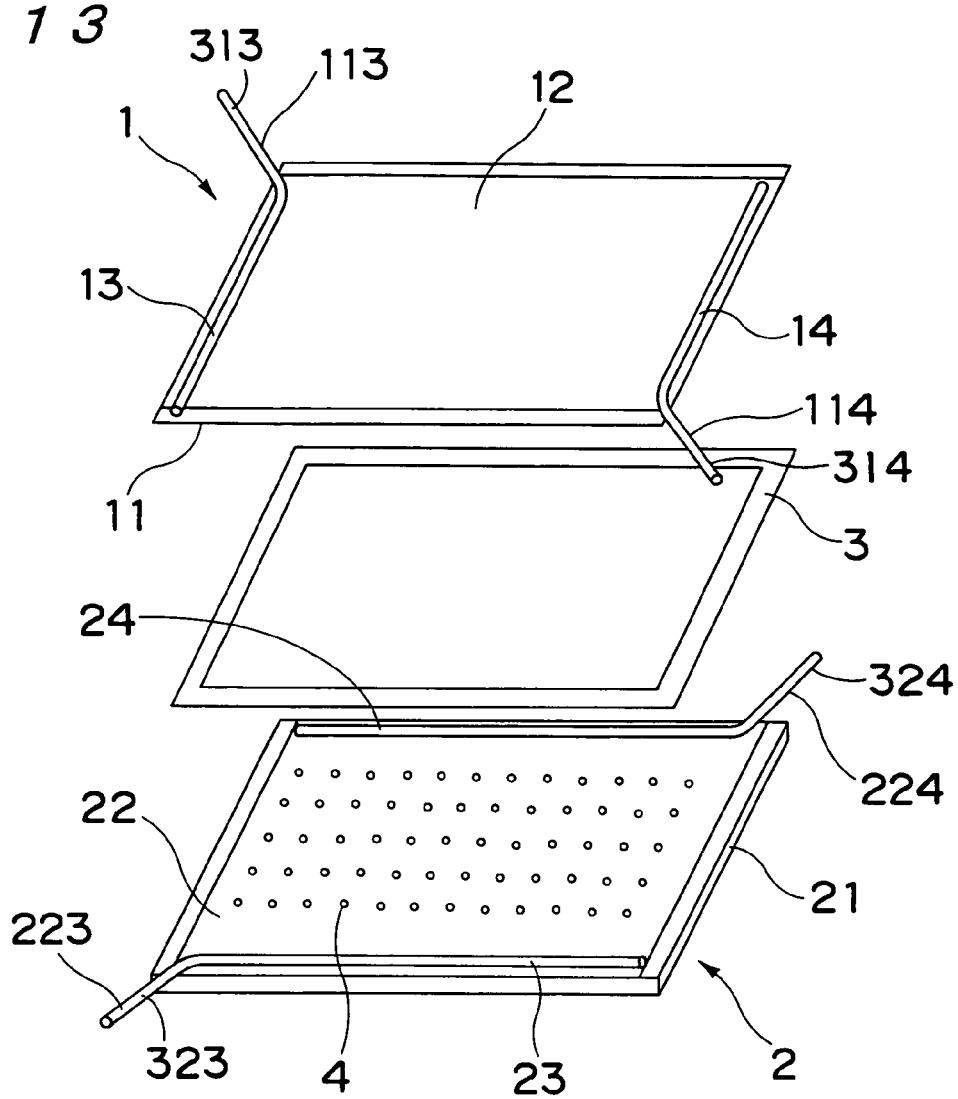
FIG. 13 is an exploded perspective view showing a touch panel according to the second embodiment of the present invention.
Figure 14:
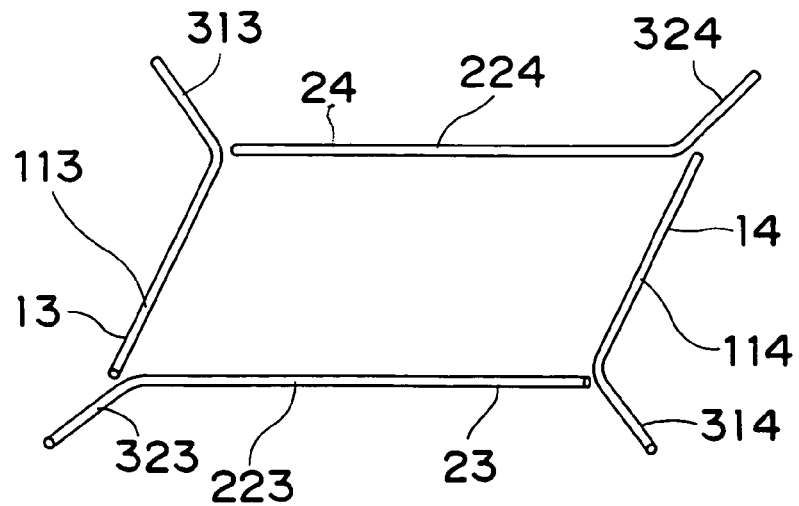
FIG. 14 is a perspective view showing the layout of extended portions of metal thin wires in FIG. 13.

The touch panel shown in FIG. 11 to FIG. 13 is an analog resistive-film type touch panel, in which an upper-side electrode member 1 having: an upper-side transparent electrode 12 on a part of the bottom face of an upper-side transparent insulating base member 11; and a pair of upper-side bus bars 13, 14 formed on the upper-side transparent electrode 12, and a lower-side electrode member 2 having: a lower-side transparent electrode 22 on a part of the top face of a lower-side transparent insulating base member 21; and a pair of lower-side bus bars 23, 24 formed on the lower-side transparent electrode 22 are disposed facing each other via a spacer 3 in such a way that the upper-side and lower-side bus bars 13, 14, 23, 24 are arranged in a square pattern, and are bonded at peripheral portions, and the touch panel in the second embodiment of the present invention is characterized in that only the upper-side and lower-side bus bars 13, 14, 23, 24 (in other words, the upper-side and lower-side bus bars 13, 14, 23, 24 and the upper-side and lower-side external terminal connection portions 313, 314, 323, 324 without the routing circuits in the second embodiment) are formed by metal thin wires 113, 114, 223, 224 with a wire diameter of 30 to 100 μm, and the metal thin wires 113, 114, 223, 224 are disposed so as to directly extend from one end of the upper-side and lower-side bus bars 13, 14, 23, 24 to the outside of the bonded upper-side electrode member 1 and the lower-side electrode member 2 to constitute the upper-side and lower-side external terminal connection portions 313, 314, 323, 324. As one example, in the lower-side electrode member 2, the metal thin wires 223, 224 are extended respectively from the lower left corner portion and the upper right corner portion of the lower-side electrode member 2 in FIG. 11 to the outside to constitute the lower-side external terminal connection portions 323, 324, while in the upper-side electrode member 1, two metal thin wires 113, 114 are extended respectively from lower left corner portion and the upper right corner portion of the upper-side electrode member 1 in FIG. 11 to the outside to constitute the upper-side external terminal connection portions 313, 314. It is to be noted that in FIG. 11 and FIG. 13, the upper-side transparent electrode 12 and the upper-side bus bars 13, 14 are described with the upper-side transparent insulating base member 11 being transparent.

It is to be noted that if the wire diameter of the metal thin wires 113, 114, 223, 224 is less than 30 μm, the wires tend to be broken, which brings about difficulty in handling in terms of manufacturing. Moreover, if the wire diameter of the metal thin wires 113, 114, 223, 224 is more than 100 μm, the gap between the transparent electrodes 12 and 22 increases, which makes input operation difficult.

As materials of the metal thin wires 113, 114, 223, 224 which satisfy the condition of the specific resistance value being $20 \times 10^{-6}$ Ω·cm or less, gold, silver, copper, nickel, tin, iron, or the like may be used for example. The metal thin wires 113, 114, 223, 224 may be structured from an identical metal or may be structured from an alloy composed of metals of two or more kinds. Further, the surroundings of the metal thin wires 113, 114, 223, 224 may be coated with a metal layer of one kind or more by plating or the like. Further, the cross sectional shape of the metal thin wires 113, 114, 223, 224 may be a round shape, a square shape, or an oval shape and has no particular limit, that is, the metal thin wires 113, 114, 223, 224 have only to be designed to have a shape adaptable accordingly.

Figure 15A:
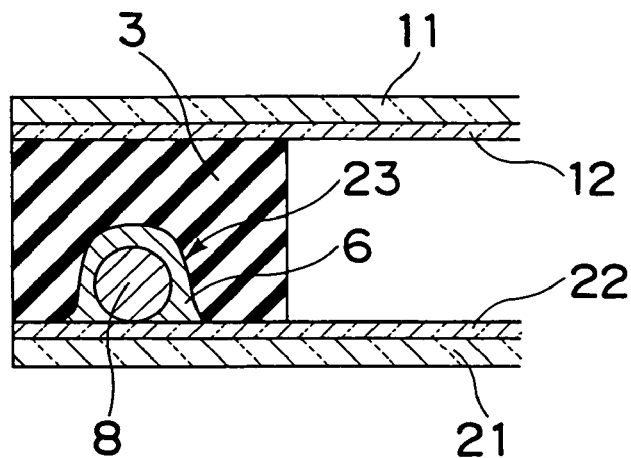
FIG. 15A and FIG. 15B are a fragmentary cross sectional view and a specific cross sectional view showing the touch panel according to the second embodiment of the present invention.
Figure 15B:
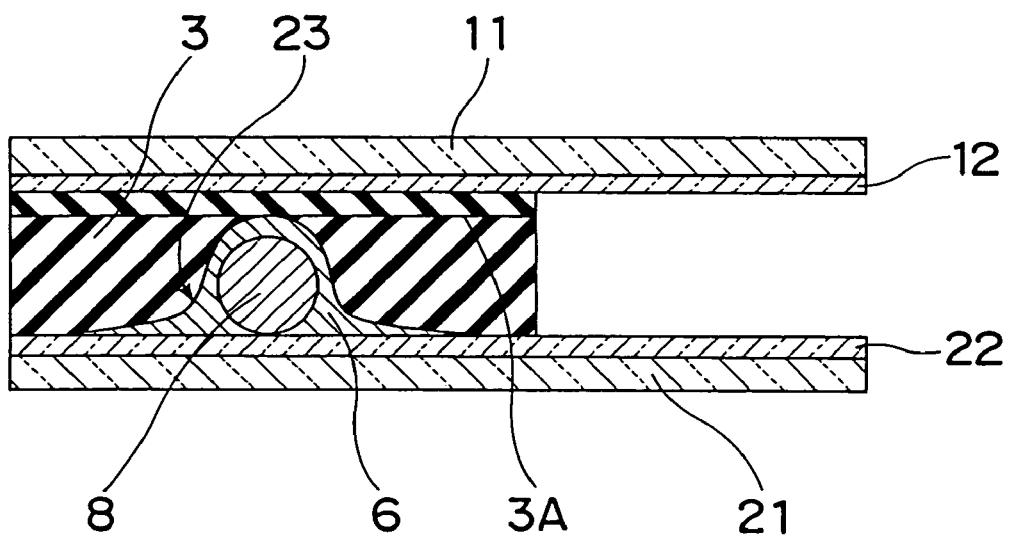

Moreover, in the thin-frame touch panel in the second embodiment of the present invention, fixing of the metal thin wires 8, 113, 114, 223, 224 onto the upper-side and lower-side transparent insulating base members 11, 21 may be achieved by covering the metal thin wires 8, 113, 114, 223, 224 on the upper-side and lower-side transparent insulating base members 11, 21 and their vicinity with a conductive paste 6 (see FIG. 15A and FIG. 15B). It is to be noted that in order to ensure the fixing, the conductive paste 6 with a thickness of 5 μm or more is covered. FIG. 15B is a specific view of FIG. 15A, in which reference numeral 3A indicates an insulating layer to ensure insulation of the upper-side and lower-side transparent electrodes 12, 22.

When the metal thin wires 8, 113, 114, 223, 224 are fixed, the dielectric paste 6 may be applied after the metal thin wires 113, 114, 223, 224 are disposed on the upper-side and lower-side transparent insulating base members 11, 21, or the metal thin wires 8, 113, 114, 223, 224 may be covered with the conductive paste 6 in advance before the metal thin wires 8, 113, 114, 223, 224 are disposed on the upper-side and lower-side transparent insulating base members 11, 21.

The conductive paste 6 is formed by dispersing conductive fillers in a resin binder. As materials of conductive fillers 32, there are, for example, gold, silver, copper, aluminum, nickel, tin, carbon, or the like.

The resin binder is a rein for joining or coupling specific materials, and in the case of the second embodiment of the present invention, the resin binder refers to a jointing material for joining the conductive fillers 32 to each other and for joining the conductive filler 32 to the top of the transparent insulating film. That usable as the resin binder includes: acrylic-based resins, urethane-based resins, epoxy-based resins, or silicon-based resins, and as for the curing method, thermosetting, solvent vaporization drying, UV curing, or the like is employed to cure the resin binder accordingly so that the resin binder is fixed onto the transparent electrode. In the case of the UV curing in particular, curing is possible at the moment the resin binder is applied, which makes it possible to fulfill such effects that 1) it is not necessary to move the resin binder to an over for curing after all the coating is completed, thereby simplifying the operation, and 2) there is no time to cause dripping, thereby offering sufficient wire width and thickness and stability in size.

Moreover, in the case of fixing the metal thin wires 113, 114, 223, 224 by covering the metal thin wires with the conductive paste 6, the width necessary for the fixing is preferably 50 to 500 µm. If the width is less than 50 µm, the adhesiveness between the metal thin wires 113, 114, 223, 224 and the upper-side and lower-side transparent electrodes 12, 22 is weakened, resulting in possible removable of the metal thin wires 113, 114, 223, 224 from the upper-side and lower-side transparent electrodes 12, 22. If the width is more than 500 µm, the adhesiveness between the peripheral portions of the upper-side electrode member 1 and the lower-side electrode member 2 is weakened, which possibly causes removal and eliminates the merit of the thin-frame configuration.

The upper-side and lower-side external terminal connection portions 313, 313, 323, 324 which are extended portions of the metal thin wires 113, 114, 223, 224 extended from one ends of the upper-side and lower-side bus bars 13, 14, 23, 24 are preferably positioned at the places close to corners of the touch panels. By designing the extended portions to be positioned as close to the corners of the touch panel as possible, implementation of the thin-frame configuration is realized and a viewable region is expanded. Moreover, the upper-side and lower-side external terminal connection portions 313, 314, 323, 324 which are the extended portions of the metal thin wires 113, 114, 223, 224 may be disposed in every corner of the touch panel and connected to external terminals (see FIG. 14), or may be gathered and disposed on two opposite corners of the touch panel and connected to external terminals (see FIG. 12). The places to dispose the extended metal thin wires 113, 114, 223, 224 (the places to dispose the upper-side and lower-side external terminal connection portions 313, 314, 323, 324 extended to the outside) may be decided in accordance with design conditions of the external terminals. It is to be noted that in a view aside from the design conditions of the external terminals, the former has a merit that insulation between the metal thin wires is ensured, whereas the latter has a merit that the number of connection points to the external terminals may be decreased, i.e., the space occupied by circuits other than the circuits of the touch panel may be decreased.

That usable as the upper-side transparent insulating base member 11 for use in the upper-side electrode member 1 includes: transparent films having flexibility such as engineering plastics films such as polycarbonate-based, polyamide-based, or polyether ketone-based plastics films; acrylic-based films; polyethlene terephthalate-based films; or polybutene terephthalate-based films. Further, the upper-side transparent insulating base member 11 of the upper-side electrode member 1 may be formed from a layered product composed of not a single film but a plurality of films overlapped. It is to be noted that a hard coat layer may be formed on the face opposite to the face on which the upper-side transparent electrode 12 of the upper-side transparent insulating base member 11 in the upper-side electrode member 1 is formed. Materials of the hard coat layer include: inorganic materials such as siloxane-based resins; or organic materials such as acrylic epoxy-based or urethane-based thermosetting-type resins, or acrylate-based photo-curing resins. The appropriate thickness of the hard coat layer is about 1 to $7 \times 10^{-3}$ mm. Moreover, in the upper-side transparent insulating base member 11 of the upper-side electrode member 1, the face opposite to the face on which the upper-side transparent electrode 12 is provided may undergo nonglare treatment for prevention of light reflection. For example, it is recommended to apply roughening on a face opposite to the face where the upper-side transparent electrode 12 is formed or to mix fine particles such as extenders, silica, or alumina in the hard coat layer.

That usable as the lower-side transparent insulating base member 21 for use in the lower-side electrode member 2 includes: glass plates such as soda glasses, borosilicate glasses, or tempered glasses; transparent resin plates or transparent films such as engineering plastics such as polycarbonate-based, polyamide-based, or polyether ketone-based plastics plates or films; or transparent resin plates or transparent films such as acrylic-based, polyethlene terephthalate-based, or polybutene terephthalate-based plates or films. The lower-side transparent insulating base member 21 for use in the lower-side electrode member 2 may be a laminated article composed of a transparent film and a transparent plastic plate or a glass plate. In this case, durability of the entire touch panel is enhanced and therefore this constitution is desirable.

The upper-side and lower-side transparent electrodes 12, 22 may be formed from: metallic oxide films such as tin oxide, indium oxide, antimony oxide, zinc oxide, cadmium oxide, or indium tin oxide (ITO); composite films mainly composed of these metallic oxide films; or metal films such as gold, silver, copper, tin, nickel, aluminum, or palladium. Moreover, the upper-side and lower-side transparent electrodes 12, 22 may be formed to be multilayer films composed of two or more layers. These transparent conductive films constituting the upper-side and lower-side transparent electrodes 12, 22 may be formed by vacuum evaporation, sputtering, ion plating, CVD method, or the like. The transparent conductive film may be patterned by performing etching treatment with acid and removing unnecessary portions other than the portions which will constitute the upper-side and lower-side transparent electrodes 12, 22. Moreover, portions other than the portions which will constitute the upper-side and lower-side transparent electrodes 12, 22 on the upper-side and lower-side transparent conductive film may be covered with an insulative coat.

The spacer 3 is formed into a shape which is capable of securing a gap between the upper-side and lower-side transparent electrodes 12, 22, e.g., a frame shape as shown in FIG. 11 and FIG. 13. While the spacer 3 may be formed from a resin film like the upper-side and lower-side transparent insulating base members or may be formed by printing or applying an appropriate resin such as acrylic-based resins, epoxy-based resins, or silicon-based resins, generally the spacer 3 doubles as a bonding layer made of a double-faced tape, a bonding agent, or an adhesive agent for bonding the upper-side electrode member 1 and the lower-side electrode member 2 at their peripheral portions. It is to be noted that in the case of forming a bonding layer made of a bonding agent or an adhesive agent, patterning of the transparent conductive film and covering of the insulating coat are necessary in order to ensure insulation between the upper-side and the lower-side as described above. In the case of the double-faced tape, sufficient insulation is ensured since the double-faced tape has a core, which saves the patterning of the transparent conductive film and covering of the insulating coat. More particularly, omission of steps and suppression of manufacturing costs are possible.

With respect to the bonding between the upper-side electrode member and the lower-side electrode member at the peripheral portion, the metal thin wires in the thin-frame touch panel in the second embodiment of the present invention do not constitute the routing circuits, so that the side of one electrode member which is bonded to the corresponding side of the other electrode member having the bus bars is always a flat face. Therefore, implementation of the thin-frame configuration does not cause deterioration of the adhesiveness, which increases reliability of the touch panel.

Moreover, in the case of forming a large-size touch panel, it is also possible to form dot-like spacers 4 on the surface of either one of the upper-side and lower-side transparent electrodes 12, 22 for securing a gap between the upper-side and lower-side transparent electrodes 12, 22 of the upper-side electrode member 1 and the lower-side electrode member 2 (see FIG. 11 and FIG. 13). The dot-like spacers 4 may be obtained by forming an acrylate resin such as melamine acrylate resins, urethane acrylate resins, epoxy acrylate resins, methacrylic acrylate resins, acrylic acrylate resins, or a transparent photo-curing resin such as polyvinyl alcohol resin into fine dots through photoprocess. Further, a plurality of fine dots may be formed by printing method to constitute spacers. Further, a dispersion liquid made from inorganic or organic particles may be sprayed or applied and then dried to obtain the spacers.

The second embodiment of the present invention relates to an analog resistive-film type touch panel which is disposed on a display screen such as LCDs and CRTs connected to computers and which is pressed from above by fingers or pens in conformity with instructions displayed on the see-through display screen for allowing the positions of pressed sections in the display screen to be inputted into the computer. Particularly, the second embodiment is applicable to information terminals (PDA=Personal Digital Assist) that attach importance to portability.

The thin-frame touch panel in the second embodiment of the present invention is structured as above so that following effects are fulfilled.

More particularly, in the thin-frame touch panel in the second embodiment of the present invention, only the bus bars (in other words, the upper-side and lower-side bus bars and the upper-side and lower-side external terminal connection portions without the routing circuits in the second embodiment) are formed by metal thin wires with the wire diameter of 30 to 100 μm, and the metal thin wires are disposed so as to directly extend from one ends of the upper-side and lower-side bus bars to the outside of the bonded upper-side electrode member and the lower-side electrode member to constitute the upper-side and lower-side external terminal connection portions, so that increase in circuit resistance may be suppressed even with a smaller wire width of the bus bar, thereby allowing provision of the touch panel with high input precision.

Further, in the thin-frame touch panel in the second embodiment of the present invention, the routing circuits are not present so that the routing circuits and the bus bars are not formed in parallel in the same plane as in the conventional case. More particularly, implementation of the thin-frame configuration on four sides may be achieved without deterioration of the input precision.

Further, in the thin-frame touch panel in the second embodiment of the present invention, the film connector is not used, so that a wide bonding area for securing the bonding strength of the film connector as in the conventional case is not necessary. Therefore, implementation of the thin-frame configuration on four sides may be achieved.

Further, according to the first embodiment and the second embodiment of the present invention, by using the metal thin wires and the conductive paste, the bus bars and the routing circuits, or the bus bars may be formed to be thinner than those in the conventional case, so that the frame-shaped spacers (double-face tapes or adhesive agents) for covering these to ensure insulation may also be formed to be thinner at the same time, which makes it possible to decrease the outer size while keeping the conventional size of an effective operation area, thereby allowing downsizing of an entire device.

Description is hereinbelow given of a more specific working example of the first embodiment.

WORKING EXAMPLE 1

With use of a polyester resin film with a length of 65 mm, a width of 86 mm, and a thickness of 125 μm as a lower-side transparent insulating base member, an ITO film with a thickness of 15 nm was formed by sputtering on the top surface of the film, and a peripheral portion of the ITO film was removed to constitute a lower-side transparent electrode. Next, in order to form parallel lower-side bus bars on two sides of the lower-side transparent electrode and lower-side routing circuits connected to the lower-side bus bars on the portions other than the lower-side transparent electrode, two metal thin wires made of gold with a wire diameter of 50 μm were disposed such that one ends extended for 15 mm to the outside of the lower-side transparent insulating base member. Further, a conductive paste was applied by a dispenser so as to cover the metal thin wires to fix the metal thin wires onto the lower-side transparent insulating base member over a width of 150 μm, by which a lower-side electrode member having a frame portion with a width of 0.5 mm starting from the edge of the lower-side transparent insulating base member was obtained.

Moreover, with use of a polyester resin film having the length and width identical to those of the transparent insulating base member of the lower-side electrode member and a thickness of 188 μm as an upper-side transparent insulating base member of an upper-side electrode member, the upper-side electrode member was obtained in the same way as the lower-side electrode member. Finally, both the electrode members were disposed facing each other via an air layer in between the electrodes, and were bonded by a double-face tape at their peripheral portions, by which the thin-frame touch panel was obtained.

WORKING EXAMPLE 2

The working example 2 is similar to the working example 1 except that metal thin wires covered with a conductive hot melt material whose outer peripheral surface was made of tin was used, and the metal thin wires were respectively fixed onto the upper-side and lower-side transparent insulating base members by the virtue of melting and solidification of the hot melt material caused by heating.

WORKING EXAMPLE 3

The working example 3 was similar to the working example 1 except that a silver paste was applied by a dispenser onto the upper-side and lower-side transparent insulating base members and that via the silver paste, the metal thin wires were respectively fixed onto the upper-side and lower-side transparent insulating base members.

WORKING EXAMPLE 4

The working example 4 was similar to the working example 1 except that after the metal thin wires were respectively fixed onto the upper-side and lower-side transparent insulating base members, a silver paste was applied to the metal thin wires and the upper-side and lower-side transparent insulating base members around the metal thin wires by a dispenser.

Description is hereinbelow given of more specific working examples of the second embodiment.

WORKING EXAMPLE 5

With use of a polyester resin film with a length of 85 mm, a width of 60 mm, and a thickness of 188 μm as a lower-side transparent insulating base member, an ITO film with a thickness of 10 nm was formed on the entire top surface of the lower-side transparent insulating base member by sputtering, and short side portions (with a width of 0.5 mm) of the ITO film were removed to constitute the other portions as the lower-side transparent electrode. Next, with respect to the long sides of the lower-side transparent insulating base member, metal thin wires (with a specific resistance value of $1.7 \times 10^{-4}$ Ω·cm) having a wire diameter of 100 μm and formed from copper wires having a wire diameter of 80 μm and tin-plated to be 10 μm thick were respectively disposed in the state of receiving tension at the positions 0.2 mm inside from their edges, and the metal thin wires on the lower-side transparent insulating base member became lower-side bus bars. Next, a conductive paste containing silver conductive fillers in a resin binder ("DW250H-57" manufactured by TOYOBO: specific resistance value of $3.5 \times 10^{-5}$ Ω·cm) was applied to the lower-side bus bars under tension and the vicinity thereof for a thickness of 15 μm by using a dispenser whose needle has an inner diameter of 300 μm, and was dried at 80° C. for 30 min. to fix the metal thin wires. Next, one of the metal thin wires was cut off from the end of the bus bar and the other end was cut off at the location 8 mm ahead of the lower-side bus bar to obtain the lower-side electrode member. The width necessary for fixing of the lower-side bus bar was 350 μm and the circuit resistance was as low as 0.09 Ω/cm.

An upper-side electrode member was obtained in the similar way as to obtain the lower-side electrode member except that with use of a polyester resin film having the length and width identical to those of the lower-side transparent insulating base member of the lower-side electrode member and a thickness of 188 μm as an upper-side transparent insulating base member of an upper-side electrode member, upper-side bus bars were formed on the shorter sides of the upper-side transparent insulating base member.

The lower-side electrode member and the upper-side electrode member having pairs of upper-side and lower-side bus bars formed on the upper-side and lower-side transparent electrodes were disposed facing each other with an air layer interposed in between the upper-side and lower-side transparent electrodes in such a way that the upper-side and lower-side bus bars were arranged in a square pattern and that the upper-side and lower-side external terminal connection portions which were the extended portions of the metal thin wires were disposed at every corner of the touch panel, and both the lower-side electrode member and the upper-side electrode member were bonded by a double-face tape with a width of 0.5 mm, by which the thin-frame touch panel was obtained.

WORKING EXAMPLE 6

The working example 6 was similar to the working example 5 except that the upper-side and lower-side external terminal connection portions which were the extended portions of the metal thin wires were gathered and disposed at two opposite corners.

It is to be understood that the present invention is not limited to aforementioned embodiments and may be embodied in other various aspects.

Figure 19:
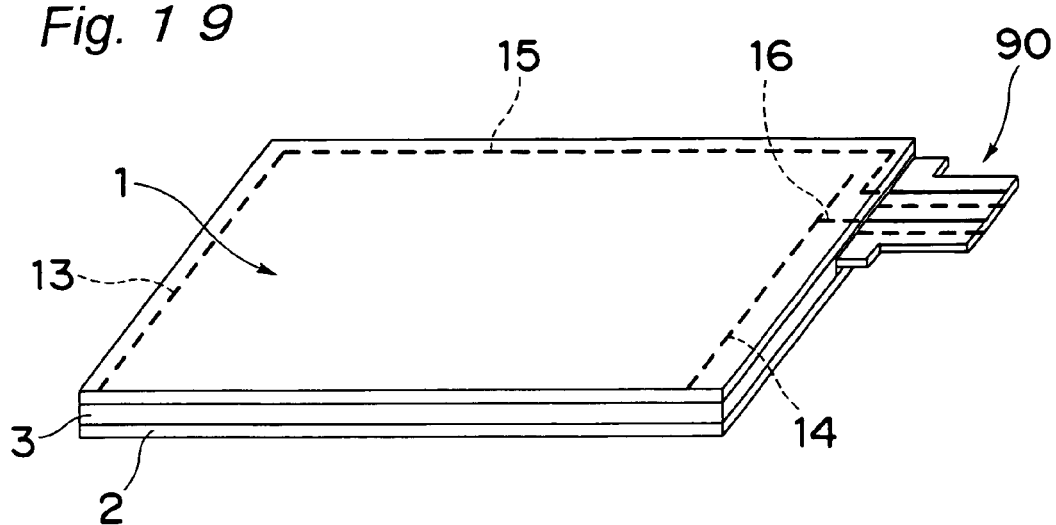
FIG. 19 is a perspective view showing a touch panel according to a modified example of the first embodiment of the present invention.
Figure 20:
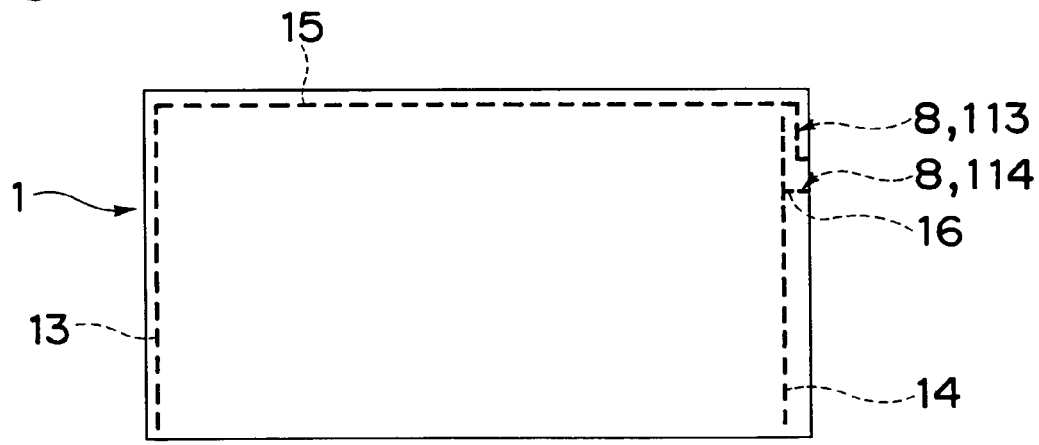
FIG. 20 is a plane view showing an upper-side electrode member in the touch panel according to the modified example of the first embodiment of the present invention in FIG. 19.
Figure 21:
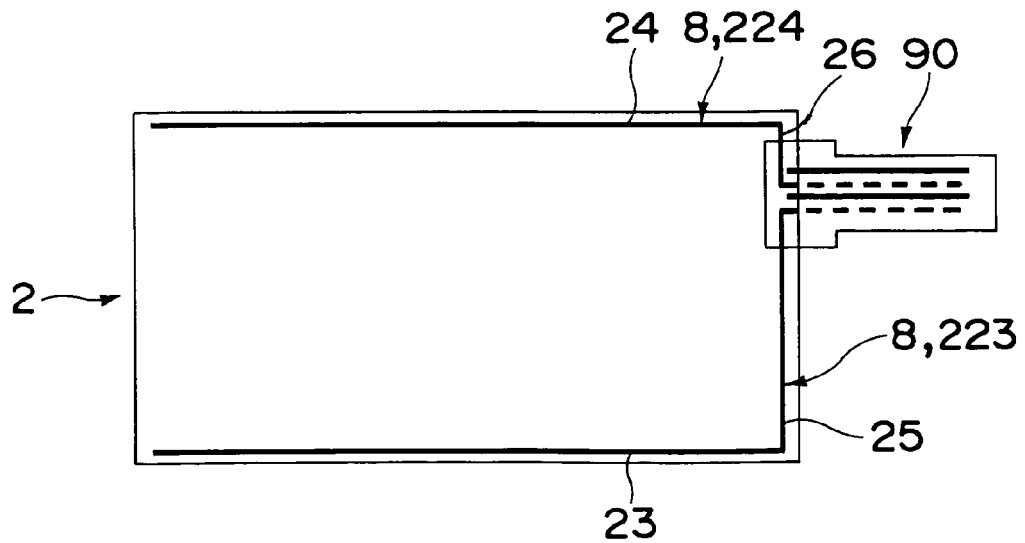
FIG. 21 is a plane view showing a lower-side electrode member in the touch panel according to the modified example of the first embodiment of the present invention in FIG. 19.

For example, although the metal thin wires were extended respectively from the upper-side electrode member 1 and the lower-side electrode member 2 to the outside to constitute the upper-side and lower-side external terminal connection portions 301, 302, 303, 304, the present invention is not limited thereto, and therefore in the touch panel according to the modified example of the first embodiment of the present invention, the upper-side electrode member 1 and the lower-side electrode member 2 may be gathered at one place and extended with use of articles other than the metal thin wires to the outside to constitute the upper-side and lower-side external terminal connection portions. More specifically, as shown in FIG. 19 to FIG. 21, a film connector 90 to which four metal thin wires constituting the routing circuits in the upper-side electrode member 1 and the lower-side electrode member 2 are collectively connected may be disposed in the vicinity of the upper end portion on the right side in FIG. 19. Such a film connector 90 is structured from a FPC (Flexible Printed Circuit) and in the case of forming a take-off portion of the touch panel, following advantages are presented. The film connector 90 having flexibility can be easily connected to or mounted on/dismounted from a main board in charge of driving of a touch panel, driving of a display, driving of an entire device, and the like, which makes it possible to decrease the number of assembly steps. Further, electric testing (before shipment or at evaluation) per touch panel single unit may be easily conducted, thereby increasing the testing processing capability. Moreover, use of standard FPCs makes it possible to reduce development costs.

Figure 17:
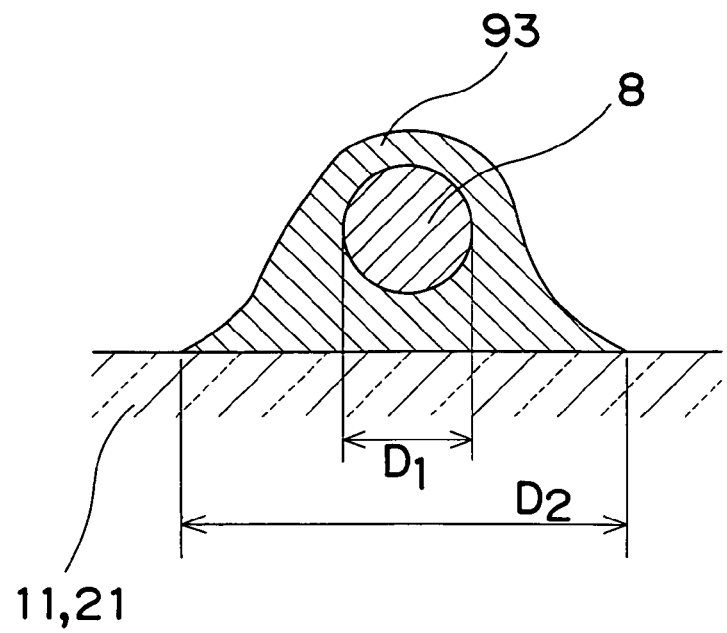
FIG. 17 is a cross sectional view showing the tolerance range of a covering layer formation width (a contact width with a fixed face) of a conductive paste in a bend portion when the metal thin wires are covered with the conductive paste in the touch panel according to the first and second embodiments of the present invention.

The metal thin wires 8, 113, 114, 223, 224 are respectively composed of linear portions 150 and a bend portion 151. Among these, the bend portion 151 receives stress such as tensile stress and contraction stress according to changes in environmental temperature, and so the bend portion 151 needs to be connected to the upper-side and lower-side transparent electrodes 12, 22 more firmly than the other portion (linear portion 150). Consequently, when the metal thin wires 8 are covered with the conductive paste 93 to form covering layers, the tolerance range of a covering layer formation width $D_2$ (see FIG. 17: a contact width with the surface of each of the upper-side and lower-side transparent electrodes 12, 22 which is a fixed face) of the conductive paste 93 in the bend portion 151 is preferably larger in lower limit than the tolerance range of the covering layer formation width in the linear portion 150.

When the metal thin wires 8 are covered with the conductive paste 93, the tolerance range of the covering layer formation width $D_2$ of the conductive paste 93 in the bus bar portions is preferably larger in lower limit than the tolerance limit of the covering layer formation width $D_2$ in other portions (the upper-side and lower-side routing circuits 15, 16, 25, 26 in the first embodiment, and output terminal portions in the second embodiment). This is because if the covering layer formation width $D_2$ of the conductive paste 93 in the bus bar portions is narrow, the adhesiveness between the metal thin wires 8 and the transparent electrodes (ITO films or the like) 11, 12 is insufficient so that a stable connection resistance is not obtained, and further a thermal expansion difference due to changes in environmental temperature may possibly cause removal. On the contrary, the portions other than the bus bar portions are disposed on the portions where the transparent electrode film is removed or the transparent electrode film is coated with an insulating film, and therefore electric connection with a base film is not necessary, and conduction is obtained only with the metal thin wires 8. It is to be noted that in the portions other than the bus bar portions, if the covering layer formation width is too narrow, then conduction cannot be obtained even if the conductive paste is used to function as an auxiliary conductive material when the metal thin wires 8 are broken as described before.

Moreover, since the connection between the upper-side transparent electrode 12 and the metal thin wires 8 receives stress such as tensile stress, constriction stress, and deflection stress upon input operation or due to changes in environmental temperature, the connection between the upper-side transparent electrode 12 and the metal thin wires 8 needs to be firmer than the connection between the lower-side transparent electrode 22 and the metal thin wires 8. Consequently, when the metal thin wires 8 are covered with the conductive paste 93, the tolerance range of the covering layer formation width $D_2$ of the conductive paste 93 in the upper-side transparent electrode 12 is preferably larger in lower limit than the tolerance range of the covering layer formation width $D_2$ of the conductive paste 93 in the lower-side transparent electrode 22.

As a result, it is preferable to structure the covering layer formation width $D_2$ of the conductive paste 93 as shown in Table 1 below for example.

TABLE 1

| | Tolerance range of covering layer formation width of conductive paste | |
|---|---|---|
| | Covering layer formation width $D_2$ of conductive paste in bend portion 151 and bus bar portions | Covering layer formation width $D_2$ of conductive paste in other portions |
| Upper-side electrode member | 3 to 5 times larger than diameter $D_1$ of metal thin wires | 2 to 5 times larger than diameter $D_1$ of metal thin wires |
| Lower-side electrode member | 2 to 5 times larger than diameter $D_1$ of metal thin wires | 1 to 5 times larger than diameter $D_1$ of metal thin wires |

Figure 18:
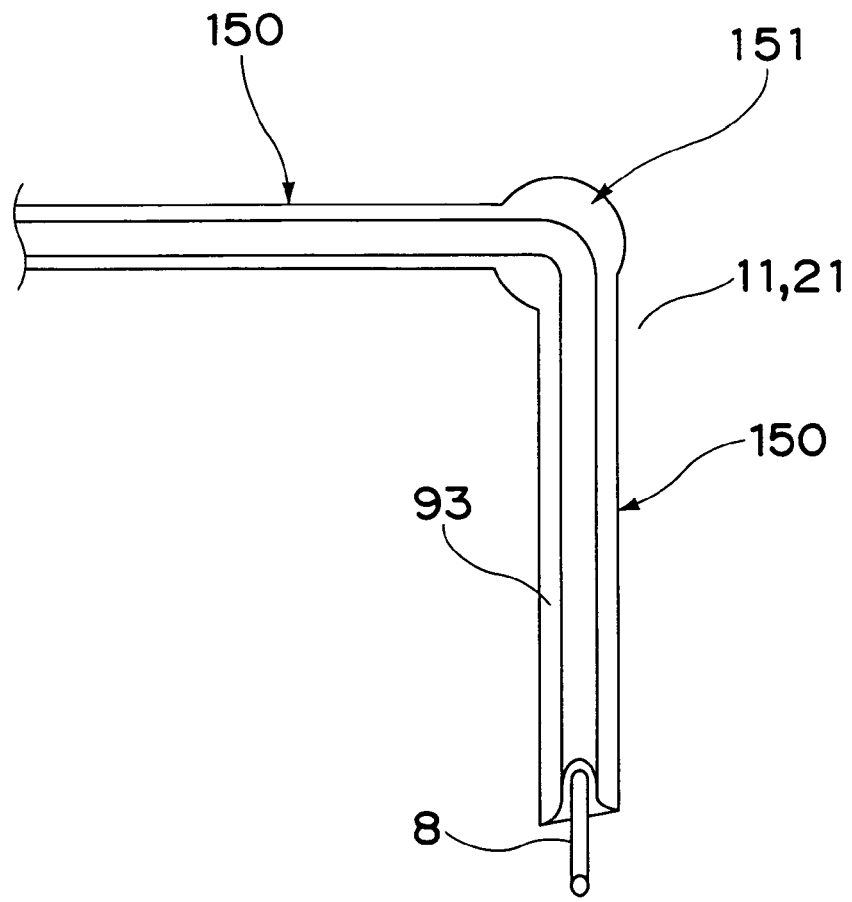
FIG. 18 is an explanatory view showing, exaggeratedly in easy-to-understand way, a linear portion formed with a relatively small width compared to the bend portion in FIG. 17.

In this structure, a connection area between the metal thin wires 8 and the upper-side and lower-side transparent electrodes 12, 22 may be assured so that the metal thin wires become strong enough to ensure tensile stress and constriction stress. For example, with reference to the easy-to-understand drawing in which the linear portion 150 is exaggeratedly formed to have a relatively narrow width, a land is formed in the bend portion 151 as shown in FIG. 18. It is to be noted that it is possible to increase the width of the linear portion 150 so as to match with the width of the bend portion 151.

Further, as a result of intense study, in the case of the metal thin wires 113, 114, 223, 224 for use in the second embodiment of the present invention, a specific resistance value of $20 \times 10^{-6}$ Ω·cm or less allows achievement of sufficient low resistance with the wire diameter of 30 to 100 μm. The specific resistance value of $20 \times 10^{-6}$ Ω·cm or less is determined based on the following ground. That is, the marginal conditions in printing for forming sufficient circuit formation patterns through screen printing are: the width of approx. 0.5 mm; and the thickness of approx. 5 μm. In that case, since the general specific resistance value of the conductive paste is $9 \times 10^{-5}$ Ω·cm, the circuit resistance is 0.35 Ω/cm. In the case of using the metal thin wires with a diameter of 30 μm, for obtaining the circuit resistance value similar to that in the screen printing, the specific resistance value of the metal thin wires 8, 113, 114, 223, 224 for use in the present invention is approx. $25 \times 10^{-6}$ Ω·cm, and therefore by selecting a metal thin wire whose specific resistance value is $20 \times 10^{-6}$ Ω·cm or less, it becomes possible to form circuits having a lower resistance and a thinner-frame configuration than the circuits formed through the screen printing.

It is to be noted that as the fixing means for the metal thin wires 8, 113, 114, 223, 224, methods other than those stated above are adoptable. For example, fixing may be achieved through melting and solidification of the transparent insulating base members 11, 21. Moreover, fixing may also be achieved by covering the metal thin wires 113, 114, 223, 224 and the upper-side and lower-side transparent insulating base members 11, 21 around the metal thin wires with a bonding agent. However, the means for covering the metal thin wires 113, 114, 223, 224 on the upper-side and lower-side transparent insulating base members 11, 21 and their vicinities with a conductive paste is most desirable in the points that there is no possibility of deterioration of the transparent electrodes 12, 22 through application of heat and pressure and that the conductive stability between the transparent electrodes 12, 22 and the metal thin wires 113, 114, 223, 224 is provided.

Moreover, as the conductive paste 6, it is preferable to use that with a specific resistance value of $1 \times 10^{-4}$ Ω·cm or less. While the conductive paste for conventional circuit formation requires lower resistance, the metal thin wires 8, 113, 114, 223, 224 in the second embodiment of the present invention are cores of the upper-side and lower-side bus bars 13, 14, 23, 24, and therefore what is required is only to assure conduction between the metal thin wires 8, 113, 114, 223, 224 and the transparent electrodes 12, 22. This expands the upper limit of the selection range of the conductive paste 6 to the conductive paste with a specific resistance value of $1 \times 10^{-4}$ Ω·cm, thereby allowing selection with due sufficient consideration of adhesiveness, reliability, and the like. However, in the case where the metal thin wires 8, 113, 114, 223, 224 are covered with the conductive paste 6 in advance and then disposed on the upper-side and lower-side transparent insulating base members 11, 21, in the case where the cross sectional shape is a round shape, or in the case where the metal thin wires having a small contact area with the upper-side and lower-side transparent electrodes 12, 22 are disposed on the upper-side and lower-side transparent insulating base members 11, 21 and then covered with the conductive paste 6, the resistance of the conductive paste 6 becomes an issue. If the specific resistance of the conductive paste 6 is more than $1 \times 10^{-4}$ Ω·cm, a rise in resistance between the metal thin wires and the transparent electrodes 12, 22 becomes nonnegligible and the input precision during input operation by pens is deteriorated.

By properly combining the arbitrary embodiments of the aforementioned various embodiments, the effects possessed by the embodiments can be produced.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. An analog resistive-film type thin-frame touch panel, comprising:
  a lower-side electrode member having
    a lower-side transparent insulating base member,
    a lower-side transparent electrode on a part of a top face of the lower-side transparent insulating base member,
    a pair of lower-side bus bars disposed on two parallel sides of the lower-side transparent electrode, and
    lower-side external terminal connection portions disposed on a portion other than the lower-side transparent electrode and connected to the lower-side bus bars;
  an upper-side electrode member having
    a flexible upper-side transparent insulating base member,
    an upper-side transparent electrode on a part of a bottom face of the flexible upper-side transparent insulating base member,
    a pair of upper-side bus bars disposed on two parallel sides of the upper-side transparent electrode, and
    upper-side external terminal connection portions disposed on a portion other than the upper-side transparent electrode and connected to the upper-side bus bars; and
  an insulative spacer, wherein
  the lower-side electrode member and the upper-side electrode member are disposed facing each other via the insulative spacers such that the upper-side bus bars and the lower-side bus bars are arranged in a square pattern, and the lower-side electrode member and the upper-side electrode member are bonded at peripheral portions,
  the lower-side bus bars are formed by metal thin wires having a circular cross section and a wire diameter of 30 to 100 μm,
  the upper-side bus bars are formed by metal thin wires having a circular cross section and a wire diameter of 30 to 100 μm, and
  the metal thin wires and a portion of each of the upper-side and lower-side transparent insulating base members around the metal thin wires are covered with a conductive paste so that the metal thin wires are respectively fixed onto the upper-side transparent insulating base member and the lower-side transparent insulating base member.

2. The thin-frame touch panel as defined in claim 1, wherein
  the lower-side electrode member further has lower-side routing circuits disposed on the portion other than the lower-side transparent electrode, for connecting the lower-side bus bars and the lower-side external terminal connection portions,
  the upper-side electrode member further has upper-side routing circuits disposed on the portion other than the upper-side transparent electrode, for connecting the upper-side bus bars and the upper-side external terminal connection portions, and
  the lower-side routing circuits are formed from metal thin wires having a circular cross section and a wire diameter of 30 to 100 μm and the upper-side routing circuits are formed from metal thin wires having a circular cross section and a wire diameter of 30 to 100 μm.

3. The thin-frame touch panel as defined in claim 2, wherein the metal thin wires constituting each of the lower-side routing circuits and the upper-side routing circuits are extended to outside of the lower-side electrode member and the upper-side electrode member to constitute the lower-side external terminal connection portions and the upper-side external terminal connection portions.

4. The thin-frame touch panel as defined in claim 2, wherein a part of each of the metal thin wires is respectively embedded in one of the upper-side and lower-side transparent insulating base members by melting and solidification of the upper-side and lower-side transparent insulating base members.

5. The thin-frame touch panel as defined in claim 4, wherein
  at least one of bend portions of the lower-side routing circuits and the lower-side bus bars of the lower-side electrode member are covered with the conductive paste to form a lower-side covering layer that has a width 2 to 5 times larger than the wire diameter of the metal thin wires of the lower-side electrode member,
  other portions of the lower-side electrode member are covered with the conductive paste to form a lower-side covering layer that has a width 1 to 5 times larger than the wire diameter of the metal thin wires of the lower-side electrode member,
  at least one of bend portions of the upper-side routing circuits and the upper-side bus bars of the upper-side electrode member are covered with the conductive paste to form an upper-side covering layer that has a width 3 to 5 times larger than the wire diameter of the metal thin wires of the upper-side electrode member, and
  other portions of the upper-side electrode member are covered with the conductive paste to form an upper-side covering layer that has a width 2 to 5 times larger than the wire diameter of the metal thin wires of the upper-side electrode member.

6. The thin-frame touch panel as defined in claim 2, wherein the lower-side and upper-side bus bars, the lower-side and upper-side routing circuits, and the lower-side and upper-side external terminal connection portions are formed at peripheries of the lower-side and upper-side transparent insulating base members and form an interconnection region of the upper-side and lower-side transparent insulating base members, the innerconnection region being formed such that its thin-frame width size as seen from an external form thereof is 2 mm or lower at least on three sides.

7. The thin-frame touch panel as defined in claim 1, wherein
  the lower-side bus bars and the lower-side external terminal connection portions are directly connected, and the lower-side external terminal connection portions are also formed by metal thin wires having a circular cross section and a wire diameter of 30 to 100 μm,
  the upper-side bus bars and the upper-side external terminal connection portions are directly connected, and the upper-side external terminal connection portions are also formed by metal thin wires having a circular cross section and a wire diameter of 30 to 100 μm, and
  the metal thin wires of the upper-side external terminal connection portions and the metal thin wires of the lower-side external terminal connection portions are extended to outside of a region where the lower-side electrode member and the upper-side electrode member are bonded to each other.

8. The thin-frame touch panel as defined in claim 1, wherein the metal thin wires have a specific resistance value of $20\times10^{-6}$ Ω·cm or less.

9. The thin-frame touch panel as defined in claim 8, wherein the with a conductive paste has a specific resistance value of $1\times10^{-4}$ Ω·cm or less.

* * * * *